United States Patent [19]

Takuma et al.

[11] Patent Number: 4,734,218

[45] Date of Patent: Mar. 29, 1988

[54] DICHROIC AZO DYESTUFFS AND LIQUID CRYSTAL COMPOSITION CONTAINING SAID DYESTUFFS

[75] Inventors: Keisuke Takuma; Kimitoshi Kato; Hiroshi Aiga, all of Ohmuta; Yasuyuki Yamada; Tsutomu Nishizawa, both of Yokohama, all of Japan

[73] Assignee: Mitsui Toatsu Chemicals, Incorporated, Tokyo, Japan

[21] Appl. No.: 889,932

[22] PCT Filed: Nov. 19, 1985

[86] PCT No.: PCT/JP85/00644

§ 371 Date: Jul. 18, 1986

§ 102(e) Date: Jul. 18, 1986

[87] PCT Pub. No.: WO86/03215

PCT Pub. Date: Jun. 5, 1986

[30] Foreign Application Priority Data

| Nov. 20, 1984 | [JP] | Japan | 59-243375 |
| Nov. 26, 1984 | [JP] | Japan | 59-248195 |
| Dec. 20, 1984 | [JP] | Japan | 59-267295 |
| Jan. 17, 1985 | [JP] | Japan | 60-6204 |
| Jan. 30, 1985 | [JP] | Japan | 60-14441 |
| May 31, 1985 | [JP] | Japan | 60-116587 |
| Jun. 11, 1985 | [JP] | Japan | 60-125131 |

[51] Int. Cl.$^4$ ............ C09B 31/02; C09B 31/16; C09K 3/34; G02F 1/13

[52] U.S. Cl. .................. 252/299.61; 252/299.1; 252/299.62; 252/299.66; 534/577; 534/595; 534/596; 534/738; 534/796; 534/797; 534/800; 534/810; 534/813; 534/829; 534/832; 534/860; 534/875; 350/349

[58] Field of Search .......... 534/738, 800, 832, 829, 534/577; 252/299.61, 299.62, 299.66, 299.68, 299.1

[56] References Cited

U.S. PATENT DOCUMENTS

| 1,858,928 | 5/1932 | Grether et al. | 534/800 X |
| 2,397,927 | 4/1946 | Dickey et al. | 534/738 X |
| 2,620,273 | 12/1952 | Jennen | 534/800 X |
| 4,600,527 | 7/1986 | Imazeki et al. | 534/577 X |
| 4,610,803 | 9/1986 | Claussen | 534/577 X |

FOREIGN PATENT DOCUMENTS

| 55-52375 | 4/1980 | Japan | 534/577 |
| 58-129058 | 8/1983 | Japan | 534/832 |
| 59-47261 | 3/1984 | Japan | 534/832 |
| 60-262858 | 12/1985 | Japan | 534/577 |
| 2036779 | 7/1980 | United Kingdom | 534/832 |

*Primary Examiner*—Floyd D. Higel
*Attorney, Agent, or Firm*—Oblon, Fisher, Spivak, McClelland & Maier

[57] ABSTRACT

Provided are novel dichroic azo dyestuffs, which contain skeletons represented by the following general formula:

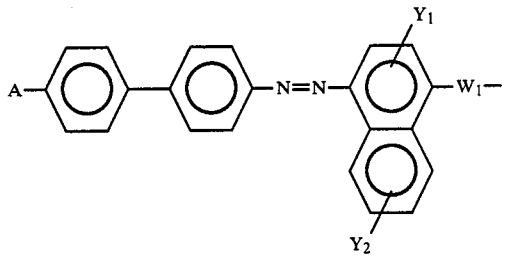

at one terminals of the long axes of the molecules of the azo dyestuffs, and liquid crystal compositions containing the dichroic azo dyestuffs in forms dissolved in liquid crystals. These dichroic azo dyestuffs have large dichroic ratios and high durability, and their compositions are employed as useful display devices.

17 Claims, No Drawings

DICHROIC AZO DYESTUFFS AND LIQUID CRYSTAL COMPOSITION CONTAINING SAID DYESTUFFS

DESCRIPTION

1. Technical Field

This invention relates to novel dichroic dyestuffs suitable for use in liquid crystals and liquid crystal compositions containing the above dyestuffs as well as display devices making use of these compositions.

2. Background Art

Liquid crystal display devices have found widespread commercial utility in recent years from the viewpoints of energy saving and size reduction. Most of liquid crystal display devices, which are currently in use, utilize electrooptical effects of twisted nematic liquid crystals and perform display operations with combined use of two polarizing films as essential conditions. Under the circumstances, numerous limitations are however imposed upon their applications. As a possible alternative liquid crystal display system, investigations have been made on so-called guest-host type liquid crystal displays each of which makes use of electrooptical effects of a colored liquid crystal composition obtained by dissolving a dichroic dyestuff in a nematic liquid crystal. Some of such liquid crystal displays have already been used as display devices in watches, clocks, electrical home appliances, inductrial meters, etc.

The principle of the guest-host type liquid crystal display system relies upon the phenomenon that molecules of a dichroic dyestuff as a guest tend to orient in accordance with the arrangement of molecules of a liquid crystal as a host. Namely, upon application of an external stimulus which is usually an electric field, the molecules of the liquid crystal change the direction of their orientation from the "off" state to the "on state" and at the same time, the molecules of the dichroic dyestuff vary the direction of their orientation. As a result, the degree of absorption of light by the molecules of the dyestuff in the former state becomes different from that in the latter state so that a display is performed. The guest-host type liquid crystal display system is based on this principle.

The dichroic dyestuff useful here is basically required to satisfy the following requirements: (1) to have sufficient color strength even at a low concentration; (2) to have a large dichroic ratio and to exhibit significant contrast by application and removal of a voltage; (3) to have sufficient solubility to the associated liquid crystal; (4) to have excellent durability and stability and to be free from deteriorating the performance of the device even when used over a long period of time; etc.

Various dichroic dyestuffs have been proposed as materials which fulfill the above-described requirements. Some of such dichroic dyestuffs have already been used in digital clocks, meters and so on. Under the circumstances, many of them are however still accompanied by drawbacks which should still be improved, that is, those having large dichroic ratios have poor durability or those excellent in durability are not equipped with such a dichroic ratio as enabling vivid display of practical utility.

DISCLOSURE OF THE INVENTION

With the foregoing in view, the present inventors have carried out an extensive investigation. As a result, novel dichroic dyestuffs having large dichroic ratios and excellent durability have now been found.

Namely, the present invention provides a novel dichroic azo dyestuff represented by the following general formula (I):

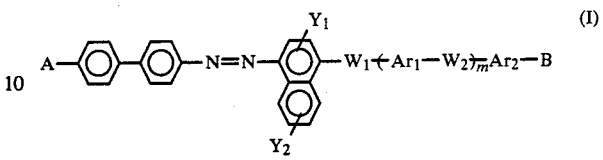

wherein A means $-CN$, $-COOR_1$,

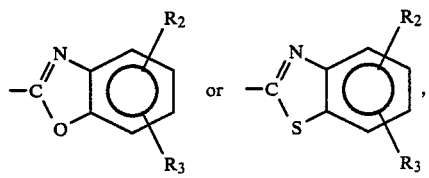

$R_1$ is an alkyl group, alkoxyalkyl group, or a phenyl or cyclohexyl group which may be substituted with an alkyl or alkoxy group at the p-position thereof, $R_2$ and $R_3$ are individually a hydrogen atom, alkyl, cycloalkyl, alkoxy, alkoxyalkoxy, cycloalkyloxyalkoxy, aryloxyalkoxy or aryl group, halogen atom, or cyano or dialkylamino group; $Y_1$ and $Y_2$ denote individually a hydrogen or halogen atom or an alkyl, alkoxy, cyano or hydroxyl group, $Ar_1$ and $Ar_2$ stand individually for

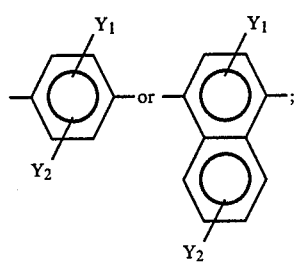

$W_1$ and $W_2$ are individually an $-N=N-$ or $-N=CH-$ group but $W_1$ is an $-N=N-$ group when $W_2$ is an $-N=CH-$ group, m stands for an integer of 0 or 1 but m is 0 when $W_1$ is an $-N=CH-$ group; and B means a hydroxyl, alkoxy, alkoxyalkyl or p-alkylbenzyloxy group,

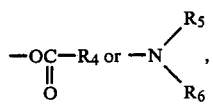

but B may be a hydrogen or halogen atom, cyano group,

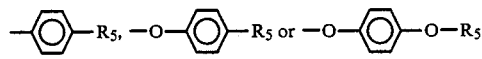

when $W_1$ or $W_2$ is an $-N=CH-$ group, $R_4$ is an alkyl group or a phenyl or cyclohexyl group which may be substituted with an alkyl or alkoxy group at the p-position thereof, $R_5$ means a hydrogen atom or alkyl group, $R_6$ denotes an alkyl group or

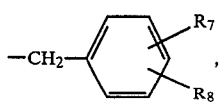

$R_7$ and $R_8$ mean individually a hydrogen or halogen atom, hydroxyl, cyano, alkyl, dialkylamino, alkoxy or alkoxyalkoxy group,

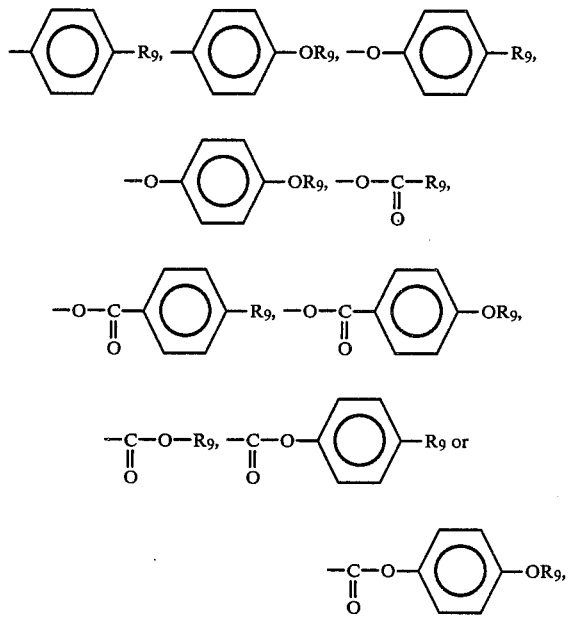

and $R_9$ is a hydrogen atom or alkyl group.

The characteristic feature of the dyestuff of this invention resides in the introduction of a skeleton represented by the following general formula (II) at one end of the longer axis of the molecule of the corresponding azo compound:

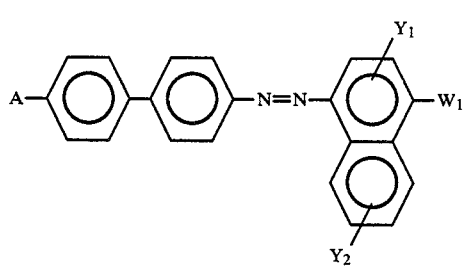

wherein A, $Y_1$, $Y_2$ and $W_1$ have the same meaning as defined in the general formula (I), whereby the dichroism has been improved significantly in comparison with similar known azo dyestuffs. More specifically, the dichroic azo dyestuff of this invention features the inclusion of the group represented by A at the terminal of the biphenyl group as shown by the general formula (II). It is therefore clearly distinguished from any known azo dyestuffs.

BEST MODE FOR CARRYING OUT THE INVENTION

Dichroic azo dyestuffs of this invention, which are represented by the general formula (I), can be synthesized by processes such as those to be described below.

For example, in the case of a compound represented by the general formula (I) in which m is 1 and $W_1$ and $W_2$ are both —N=N— groups, an amine represented by the following general formula (III):

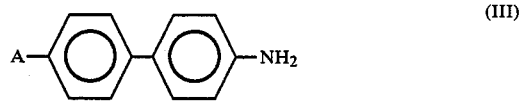

wherein A has the same meaning as in the general formula (I) is diazotized in accordance with a usual method, followed by its coupling with a compound represented by the following general formula (IV):

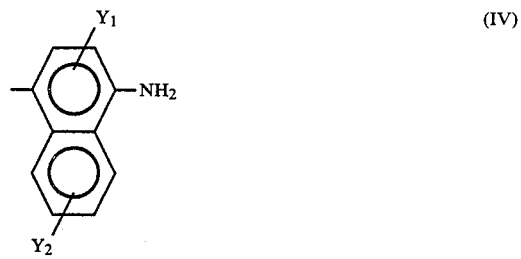

wherein $Y_1$ and $Y_2$ have the same meaning as in the general formula (I) to obtain a monoazo dyestuff represented by the following general formula (V):

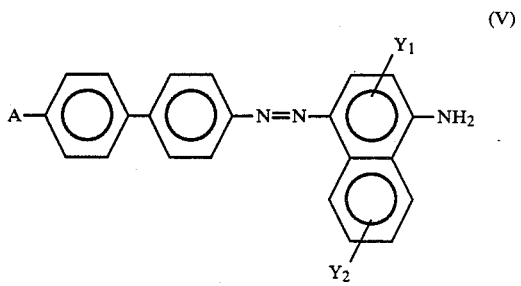

wherein A, $Y_1$ and $Y_2$ have the same meaning as in the general formula (I). Thereafter, the monoazo compound is similarly diazotized in a usual manner, followed by its coupling with a compound represented by the following general formula (VI):

$Ar_1$—$NH_2$ (VI)

wherein $Ar_1$ has the same meaning as in the general formula (I), thereby obtaining a disazo dyestuff represented by the following general formula (VII):

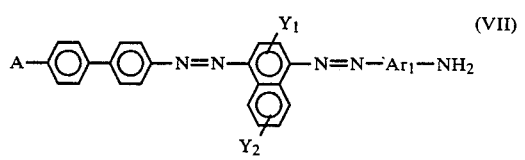

wherein A, $Y_1$, $Y_2$ and $Ar_1$ have the same meaning as in the general formula (I). This disazo dyestuff is further diazotized by a usual method, followed by its coupling with a compound represented by the following general formula (VIII):

$$Ar_2-B \qquad (VIII)$$

or by the following general formula (IX):

$$Ar_2-OH \qquad (IX)$$

wherein $Ar_2$ and B have the same meaning as in the general formula (I) to obtain a compound represented by the general formula (I) or a compound represented by the following general formula (X):

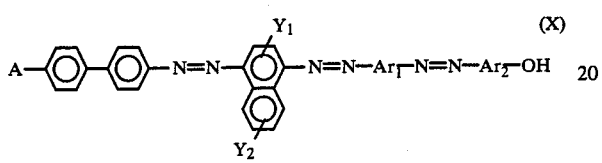

wherein A, $Y_1$, $Y_2$, $Ar_1$ and $Ar_2$ have the same meaning as in the general formula (I). The latter compound is a precursor for the former compound.

The compound (X) is then subjected, together with a halogen compound represented by the following general formula (XI):

$$Hal-B' \qquad (XI)$$

wherein Hal means a halogen atom represented by Cl or Br and B' denotes a precursor group capable of undergoing condensation with the compound of the general formula (X) to become the same group as B in the general formula (I), to a dehydrohalogenating and condensing reaction by a usual method, thereby obtaining the intended dichroic azo dyestuff of this invention.

When m=0, the compound of the general formula (V) is diazotized, followed by its coupling with the compound represented by the compound represented by the general formula (VIII) or (IX) and if necessary, followed further by its condensation with the halogen compound represented by the general formula (IX), thereby obtaining the intended dichroic compound of this invention in the same manner.

On the other hand, in the case of a compound represented by the general formula (I) in which $W_1$ or $W_2$ is an —N=CH— group, an amino compound represented by the general formula (V) or (VII) and an aldehyde compound represented by the following general formula (XII):

$$OHC-Ar_2-B \qquad (XII)$$

wherein $Ar_2$ and B have the same meaning as in the general formula (I) are subjected to dehydrating condensation by a usual method, thereby obtaining a dichroic azo dyestuff of this invention.

Although the dichroic azo dyestuffs of this invention can be synthesized by such processes as those mentioned above, it is also possible to synthesize the dichroic azo dyestuffs of this invention by combining other known unit reactions in various ways.

The thus-obtained crude dyestuffs of the general formula (I) are then purified by recrystallization, column chromatography or the like, so that high-purity dyestuffs can be obtained.

Certain specific representative examples of the dichroic dyestuffs of this invention will be described in Examples.

The dichroic azo dyestuffs are however not limited to them. As $R_1$, $R_2$, $R_3$, $Y_1$, $Y_2$, $Ar_1$, $Ar_2$ and B contained in the general formula (I), the following specific groups may be mentioned.

As specific examples of $R_1$ in the general formula (I), there may be mentioned groups having structural formulae such as: $-CH_3$, $-C_2H_5$, $-(CH_2)_3CH_3$, $-(CH_2)_7CH_3$, $-C_2H_4CH(CH_3)CH_2-(CH_3)_3$, $-(CH_2)_{10}CH_3$,

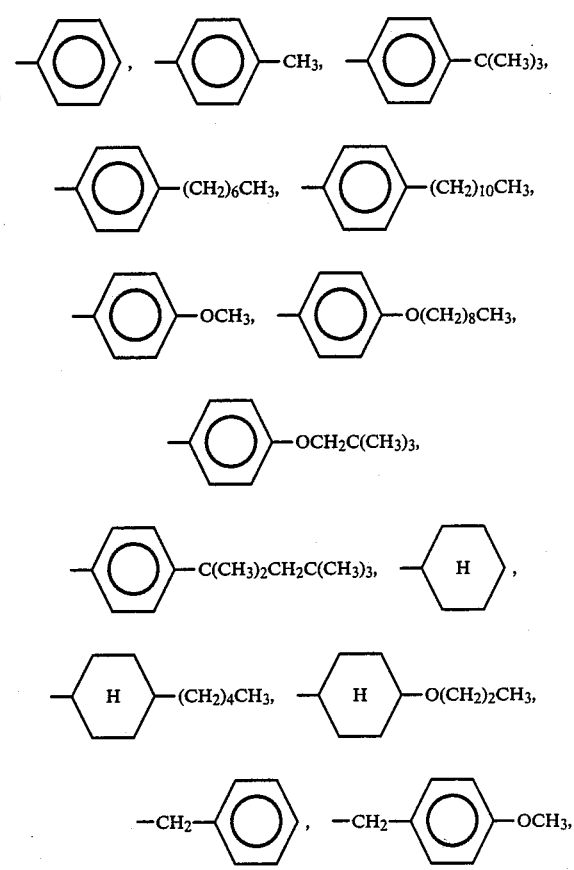

$-C_2H_4OC_2H_5$, $-C_2H_4O(CH_2)_3CH_3$. Among these, alkyl groups having 15 or less carbon atoms are preferred as $R_1$ for their dichroic effects and easiness in preparation.

As specific examples of $R_2$ and $R_3$, may be mentioned hydrogen atom, alkyl groups such as $-CH_3$, $-C_2H_5$, $-(CH_2)_2CH_3$, $-CH(CH_3)_2$, $-(CH_2)_7CH_3$, $-CH_2C(CH_3)_3$ and $-(CH_2)_{10}CH_3$, alkoxy groups such as $-OCH_3$, $-OC_2H_5$, $-O(CH_2)_7CH_3$, $-OC_2H_4CH(CH_3)CH_2C(CH_3)_3$ and $-O(CH_2)_{12}CH_3$, cycloalkyl groups such as

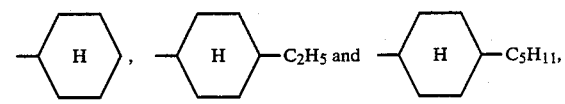

alkoxyalkoxy groups such as —OCH$_2$CH$_2$OC$_2$H$_5$, —OCH$_2$CH$_2$OCH$_2$CH(CH$_3$)$_2$, cycloalkyloxyalkoxy groups such as

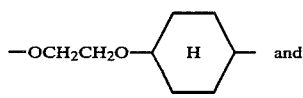 and

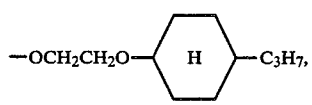, aryloxyalkoxy groups such as

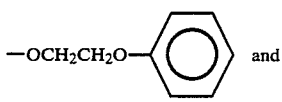 and

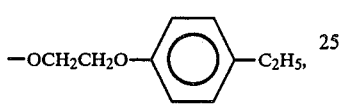, aryl groups such as

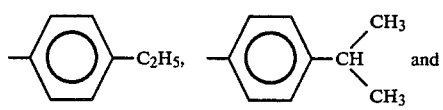

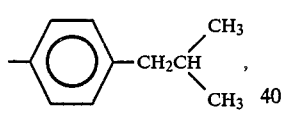, halogen atoms such as —F, —Cl and —Br, cyano group, and dialkyl amino groups such as

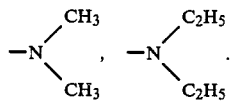.

Even when R$_2$ and R$_3$ are hydrogen atoms, i.e., even in the case of an unsubstituted benzooxazole ring or unsubstituted benzothiazole ring, practically sufficient dichroism is still exhibited. It is hence advantageous from the standpoint of product cost that R$_2$ and R$_3$ are both hydrogen atoms.

As specific examples of Y$_1$ and Y$_2$, may be mentioned —H, —Cl, —Br, —I, —F, —CN, —OH, —OCH$_3$ and —CH$_3$. Large dichroic effects are exhibited and the purification of reaction products is easy, especially, when Y$_1$ and Y$_2$ are both hydrogen atoms. Therefore, Y$_1$ and Y$_2$ are preferably hydrogen atoms at the same time.

On the other hand, specific examples of Ar$_1$ and Ar$_2$ may include groups having structural formulae such as

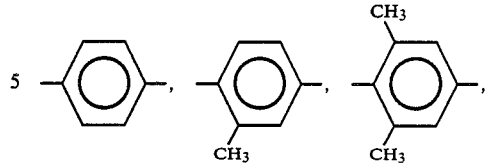

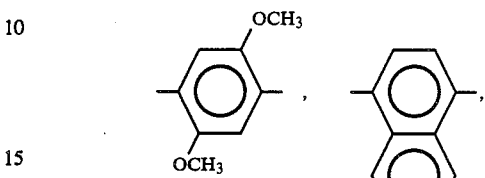

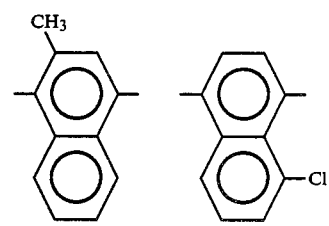

As specific examples of B, there may be hydroxyl group, alkoxy groups such as —OCH$_3$, —OC$_2$H$_5$, —OC$_4$H$_9$(n), —OC(CH$_3$)$_3$, —O(CH$_2$)$_5$CH$_3$, —O(CH$_2$)$_7$CH$_3$, —OC$_2$H$_4$CH(CH$_3$)CH$_2$C(CH$_3$)$_3$ and —O(CH$_2$)$_{12}$CH$_3$, alkoxyalkoxy groups such as —OCH$_2$CH$_2$OC$_2$H$_5$ and —OCH$_2$CH$_2$OCH$_2$CH(CH$_3$)$_2$ p-alkylbenzyloxy groups such as

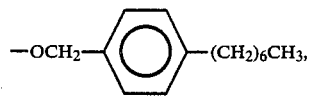

and dialkylamino groups such as —N(CH$_3$)$_2$ and —N(C$_2$H$_5$)$_2$.

When B is represented by

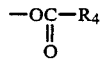

on the other hand, specific examples of R$_4$ may include groups having structural formulae such as —CH$_3$, —C$_2$H$_5$, —(CH$_2$)$_3$CH$_3$, —(CH$_2$)$_7$CH$_3$, —C$_2$H$_4$CH(CH$_3$)CH$_2$—(CH$_3$)$_3$, —(CH$_2$)$_{10}$CH$_3$,

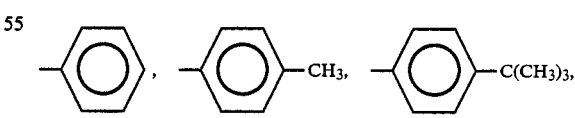

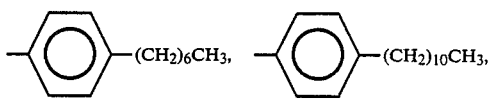

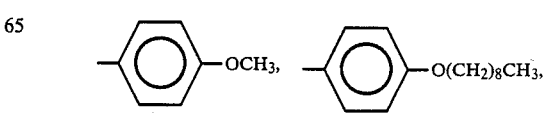

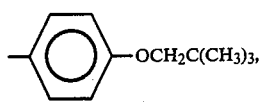
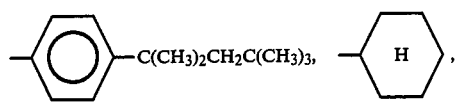
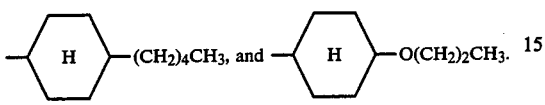
When B is represented by
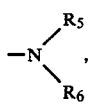
hydrogen atom, and alkyl groups such as —CH$_3$, —C$_2$H$_5$ and —C$_4$H$_9$ may be mentioned as specific examples of R$_5$. As specific examples of R$_6$, there may be mentioned alkyl groups such as —CH$_3$, —C$_2$H$_5$, —C$_4$H$_9$(n) and —CH$_2$CH(CH$_3$)$_2$,
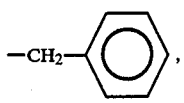
and nucleus-substituted benzyl groups such
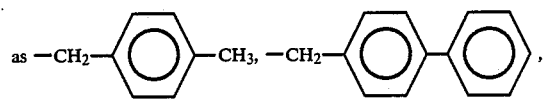
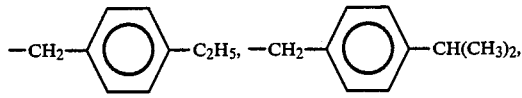
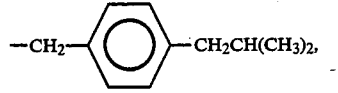
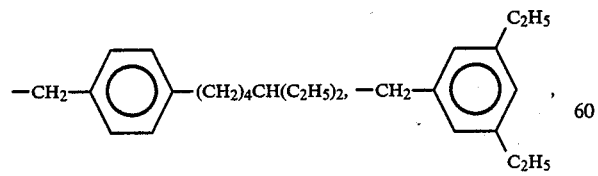
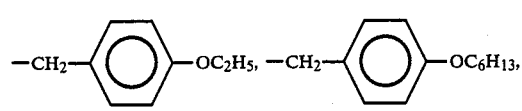
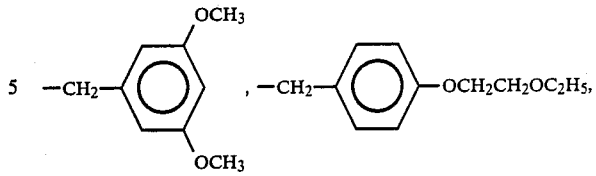
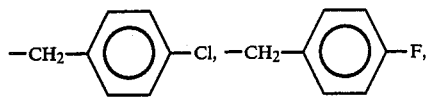
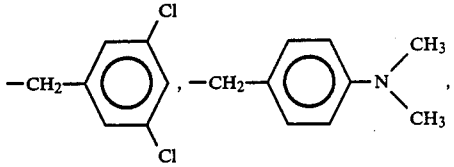
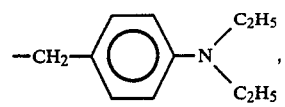
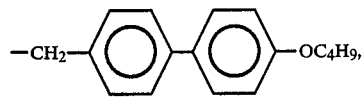
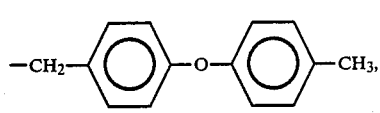
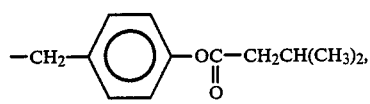
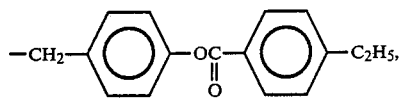
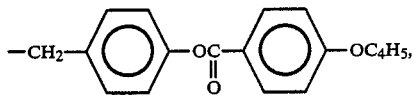
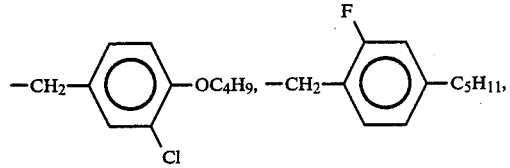
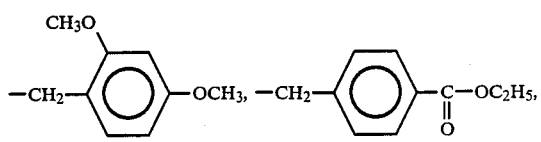

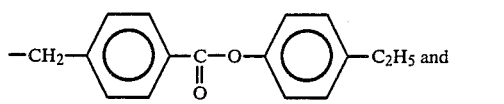

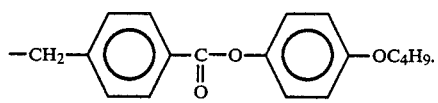

The dichroic azo dyestuffs of the present invention can be incorporated in liquid crystals for use as color display liquid crystal compositions in conventional display devices.

Conventional nematic liquid crystals, cholesteric liquid crystals, smectic liquid crystals and chiral nematic liquid crystals can all be used as liquid crystal materials. As their examples, may be mentioned liquid crystals of the biphenyl, terphenyl, phenylcyclohexane, cyclohexylcyclohexane, phenylcyclohexanoate, phenylbenzoate, cyclohexylcyclohexanoate, biphenylcyclohexanoate, phenoxycarbonylphenylbenzoate, Schiff base, phenylbiphenylcarboxylate, pyrimidine, dioxane, cyclohexylmethyl ether and cinnamonitrile types.

The dyestuffs according to the present invention may be used singly. Alternatively, two or more of the dyestuffs may also be used in combination. Any dyestuff concentrations may be employed so long as they do not exceed the upper limit of solubility of each dyestuff in a liquid crystal and at the same time, fall within a range in which the molecules of the dyestuff are sufficiently controlled in orientation by the orientation of the molecules of the liquid crystal. In general, it is recommendable to use it at a concentration of 0.01–10 wt.%, preferably, 0.01–5 wt.% based on the associated liquid crystal.

It is also feasible to mix a dichroic dyestuff of this invention with another dichroic or non-dichroic dyestuff to use the resultant mixture as a dichroic dyestuff of a desired color hue. No limitation is imposed in this concern. The dissolution of a dichroic dyestuff in a liquid crystal is effected by adding a predetermined amount of the dyestuff to the liquid crystal and stirring the resultant mixture for a long period of time or heating the resultant mixture to at least a temperature, above which the liquid crystal is converted into an isotropic liquid, and then stirring it at the same temperature. In this manner, the dichroic dyestuff can be formulated into a desired color-display liquid crystal composition.

Exemplary syntheses of certain azo-type dichroic dyestuffs of this invention as well as the structures of some representative dyestuffs and their dichroic ratios and dissolved colors in a liquid crystals ("ZLI-1565", "ZLI-1840" or "E-8" of Merck & Co., Inc.) will hereinafter be described in the following Examples.

Dichroic ratios, which will be given in the Examples, are characteristic values which demonstrate the utility of the novel dichroic dyestuffs of this invention most clearly. The dichroic ratios shown in the Examples were each obtained by dissolving each dichroic dyestuff at a concentration of 1.0 wt.% in a liquid crystal produced by Merck & Co., Inc (trade name: ZLI-1565, ZLI-1840 or E-8) which is a typical nematic liquid-crystal, sealing it within glass liquid crystal cell having a gap of 10 μm which had beforehand been treated so as to ensure homogeneous orientation, placing the resultant liquid crystal cell in the light path of a spectrophotometer, applying linearly polarized light parallel to the alignment of the liquid crystal to measure the absorbance ($A_{11}$) linearly polarized light perpendicular to the arrangement of the liquid crystal to measure the absorbance ($A_\perp$), and then making a calculation in accordance with the following equation:

$$\text{Dichroic ratio} = \frac{A_{11}}{A_\perp}$$

All of the dichroic dyestuffs of this invention show extremely high dichroic ratios.

EXAMPLE 1

After dissolving 15 parts of a compound represented by the following formula:

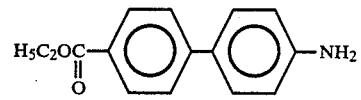

in 300 parts of N,N-dimethylformamide (hereinafter described as "DMF"), 69 parts of 35% hydrochloric acid were added. The resultant mixture was cooled below 5° C., followed by a dropwise addition of 22 parts of a 30% aqueous solution of sodium nitrite. After stirring the mixture at the same temperature for 2 hours, 3.6 parts of sulfamic acid were added to obtain a diazotized liquid mixture. The diazotized liquid mixture was poured in 500 parts of ice water, to which a solution of 5.5 parts of α-naphthylamine in 30 parts of DMF was added dropwise, followed by its stirring at 0°–5° C. for 2 hours. Subsequent to adjustment to pH=4 with a 45% aqueous solution of caustic soda, the mixture was filtered and the solid matter was washed and then dried to obtain 23.5 parts of a crude product, which was a monoazo dyestuff represented by the following formula:

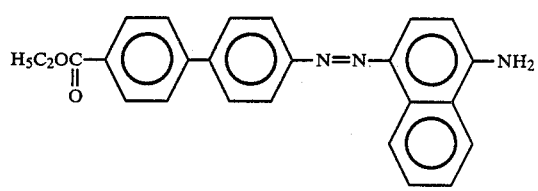

Dissolved in 200 parts of DMF were 4.0 parts of the above-obtained monoazo dye, followed by an addition of 10 parts of 35% hydrochloric acid. After cooling the resultant mixture below 5° C., 10 parts of a 10% aqueous solution of sodium nitrite were added dropwise and the mixture was stirred for 2 hours at the same temperature. Upon addition of 1.0 part of sulfamic acid, a diazotized liquid mixture was obtained. The resultant diazotized liquid mixture was added with 300 parts of 50% acetone water to dissolve the diazotized liquid mixture completely. To the resultant solution, a solution of 3.1 parts of N-(p-ethoxybenzyl)-α-naphthylamine dissolved in 20 parts of DMF was added dropwise. After stirring the resultant mixture at 0°–5° C. and pH=3–4 for 3 hours, the mixture was poured with stirring in 1,000 parts of ice water. The resultant mixture was neutralized and filtered. The solid matter was washed with water and then dried, thereby obtaining 6.3 parts of a crude product which was a disazo dyestuff represented by the following formula:

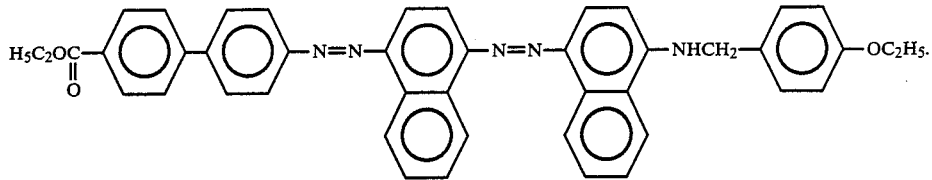

The crude product was dissolved in toluene and then isolated and purified on a column chromatograph filled with silica gel powder using toluene as an eluent, thereby obtaining 4.8 parts of the above product in its pure and disazo-colored form.

In a small beaker, 1.0 wt.% of the above disazo dyestuff was then added to the liquid crystal "ZLI-1565" produced by Merck & Co., Inc. The resultant mixture was heated to about 80° C. to form a completely clear solution.

After allowing the solution to stand and to cool down, the resultant colored liquid crystal solution was sealed in a test cell for a liquid crystal display.

The display cell showed a bluish purple color while no voltage was applied. When a voltage of 5 V was applied, it became substantially colorless only at its electrodes and very good contrast was produced. In addition, the dichroic ratio determined in accordance with the above-described polarizing light method was 17.7 at its maximum absorption wavelength of 576 nm.

EXAMPLE 2

The compound represented by the following formula:

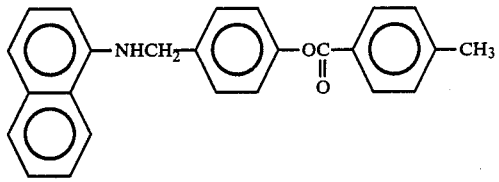

which was synthesized in Example 1, was diazotized similarly, followed by its coupling with N-(p-ethylcarbonyloxybenzyl)-N-methylaniline to obtain a disazo dyestuff represented by the following formula:

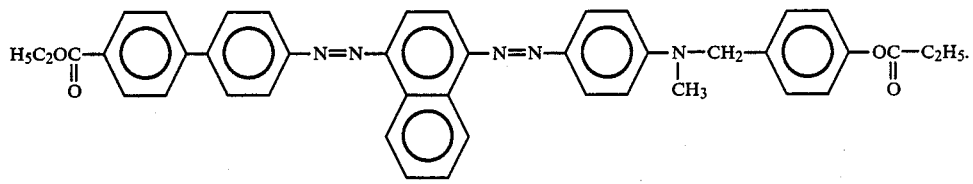

The dichroic ratio of the purified dyestuff was 15.3 at its maximum absorption wavelength of 545 nm.

EXAMPLE 3

Similar to Example 1, a compound of the following formula:

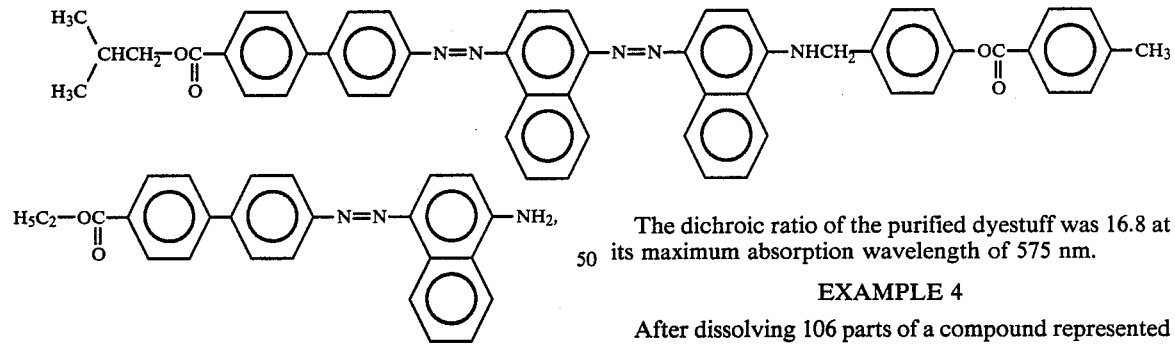

was synthesized first of all. It was then diazotized, followed by its coupling with a compound represented by the following formula:

to obtain a disazo dyestuff represented by the following formula:

The dichroic ratio of the purified dyestuff was 16.8 at its maximum absorption wavelength of 575 nm.

EXAMPLE 4

After dissolving 106 parts of a compound represented by the following formula:

dried to obtain 7.2 parts of a solid product, which was a trisazo dyestuff represented by the following formula:

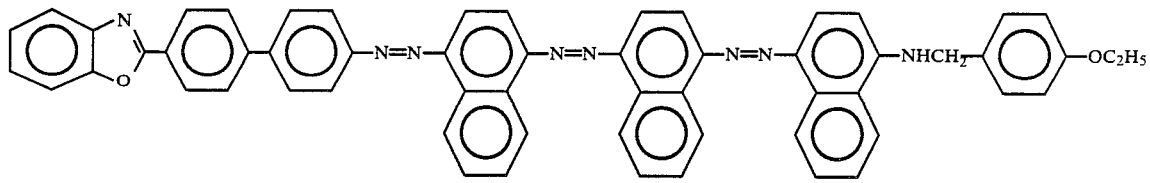

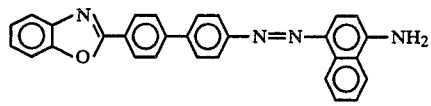

in 1,000 parts of N,N-dimethylformamide, 120 parts of 35% hydrochloric acid were added. The resultant mixture was cooled below 5° C., followed by a dropwise addition of 125 parts of a 20% aqueous solution of sodium nitrite. After stirring the mixture at the same temperature for 2 hours, sulfamic acid was added to obtain a diazotized liquid mixture. After adjusting the diazotized liquid mixture to pH=4, a DMF solution with 36 parts of α-naphthylamine dissolved therein was added dropwise and the resultant mixture was stirred at 0°–5° C. for 3 hours. The reaction mixture was poured in 1,500 parts of water, followed by its filtration. The thus-obtained solid matter was washed with water and then dried, thereby obtaining 116 parts of a crude product which was a disazo dyestuff represented by the following formula:

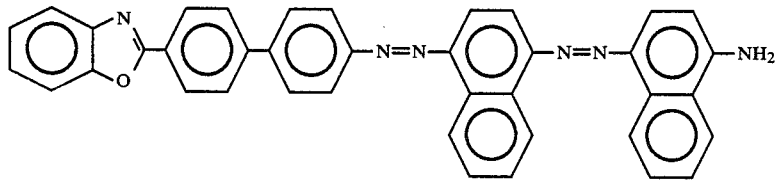

Six parts of the above-obtained disazo dyestuff were dissolved in 150 parts of DMF, followed by an addition of 10 parts of 35% hydrochloric acid. The resultant mixture was cooled below 5° C. While vigorously mixing the thus-cooled mixture, 10 parts of a 10% aqueous solution of sodium nitrite were added dropwise. After stirring the mixture at the same temperature for 3 hours, sulfamic acid was added to obtain a diazotized liquid mixture. To the diazotized liquid mixture, a solution of 3 parts of N-(p-ethoxybenzyl)-α-naphthylamine dissolved in 30 parts of DMF was added dropwise and the resultant mixture was then stirred at 3°–8° C. for 3 hours. The reaction mixture was poured in 600 parts of water. After adjustment to pH=6–7, the mixture was filtered and the resultant solid matter was washed with water and then dried. It was thereafter dispersed in methanol and stirred for 1 hour. The methanol dispersion was filtered and the resulting solid matter was The crude product was dissolved in toluene and was then isolated and purified by column chromatography on a column filled with silica gel, thereby obtaining 28 parts of the trisazo dye.

Then, 1.0 wt.% of the above trisazo dyestuff was added to the liquid crystal "ZLI-1565" produced by Merck & Co., Inc. The resultant mixture was heated to about 80° C. to form a completely clear solution. After allowing the solution to stand and to cool down, the resultant colored liquid crystal solution was sealed in a liquid crystal display device.

The display device showed a bluish purple color while no voltage was applied. When a voltage was applied, it became colorless at its electrodes only and good contrast was produced. In this case, the dichroic ratio was 18.7 at its maximum absorption wavelength of 572 nm.

EXAMPLE 5

Similar to Example 4, the compound of the following formula:

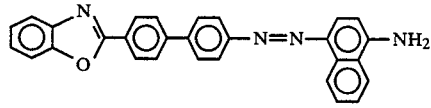

was diazotized, followed by its coupling with an amine represented by the following formula:

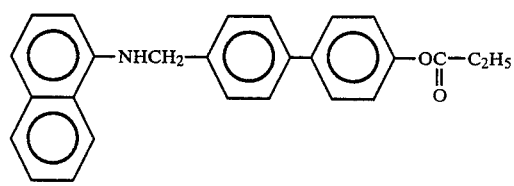

to obtain a disazo dyestuff represented by the following formula:

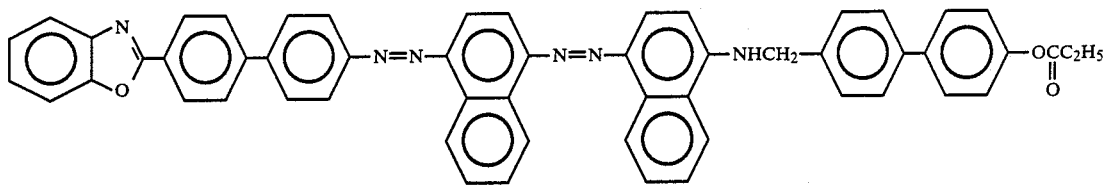

The dichroic ratio of the purified dyestuff in "ZLI-1565" was 18.2 at its maximum absorption wavelength of 575 nm.

EXAMPLE 6

Similar to Example 4, after obtaining a disazo dyestuff represented by the following formula:

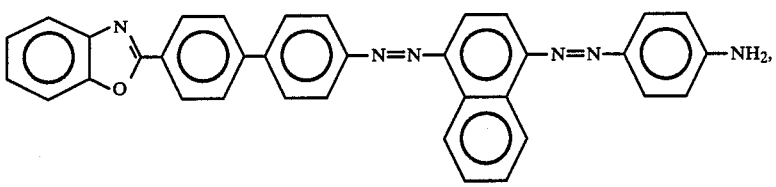

the compound was diazotized and then coupled with a compound of the following formula:

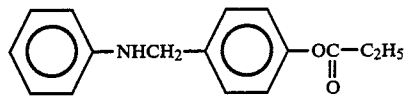

to obtain a disazo dyestuff represented by the following formula:

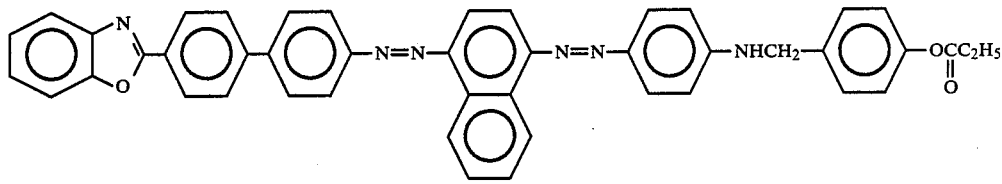

The dichroic ratio of the purified dyestuff in "ZLI-1565" was 16.4 at its maximum absorption wavelength of 539 nm.

EXAMPLE 8

Monoazo Step:
After dissolving 7 parts of a compound represented by the following formula:

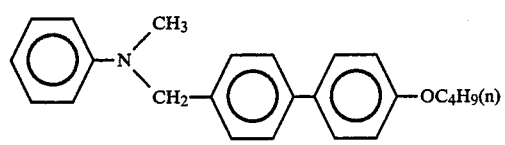

to obtain a trisazo dyestuff represented by the following formula:

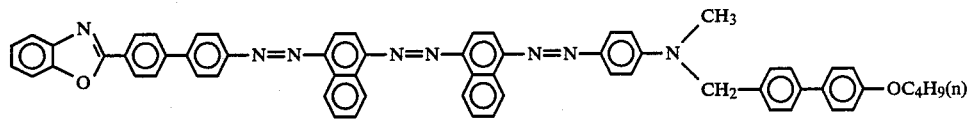

The dichroic ratio of the purified dyestuff in "ZLI-1565" was 18.1 at its maximum absorption wavelength of 582 nm.

EXAMPLE 7

Similar to Example 5, after diazotization of a compound represented by the following formula:

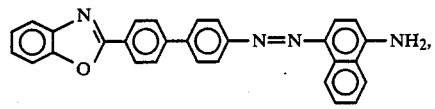

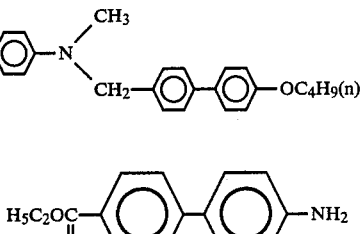

in 400 parts of DMF, 20 parts of 35% hydrochloric acid were added. The resultant mixture was cooled below 5° C., followed by a dropwise addition of 25 parts of a 10% solution of sodium nitrite. After stirring the thus-obtained mixture at the same temperature for 2 hours, sulfamic acid was added to obtain a diazotized liquid mixture. Subsequent to adjustment of the diazotized liquid mixture of pH=4,57.5 parts of an aqueous solution containing 7.5 parts of sodium α-naphthylaminemethanesulfonate dissolved therein. The resultant mixture was stirred at 0°-5° C. for 2 hours. The reaction mixture was then poured in 1,000 parts of ice water, followed by its filtration. The thus-obtained cake was dispersed in 1 l of water. The dispersion was stirred at 85°-90° C. for 8 hours. It was then filtered, and the resulting solid matter was washed with water and then dried to obtain 8 parts of a crude product which was a monoazo compound represented by the following formula:

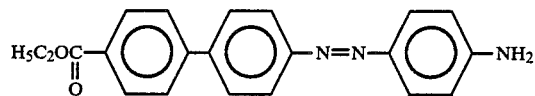

Disazo step:

After dissolving 4 parts of the above-obtained monoazo compound in 200 parts of DMF, 12 parts of 35% hydrochloric acid were added. The resulting mixture was cooled below 5° C., followed by a dropwise addition of 12 parts of a 10% aqueous solution of sodium nitrite. After stirring the thus-obtained mixture at the same temperature for 2 hours, sulfamic acid was added to obtain a diazotized liquid mixture. A solution of 2.2 parts of α-naphthylamine dissolved in 10 parts of DMF was added dropwise and the resultant mixture was then stirred at 0°-5° C. for 2 hours. The reaction mixture was poured in 500 parts of ice water, followed by its filtration. The resulting solid matter was washed with water and then dried, thereby obtaining 5 parts of crude product which was a disazo compound represented by the following formula:

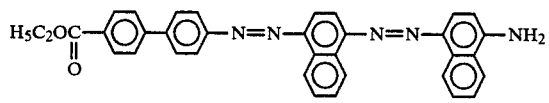

Trisazo step:

Five parts of the above-obtained disazo compound were dissolved in 300 parts of DMF, followed by an addition of 10 parts of 35% hydrochloric acid. The resultant mixture was cooled to 0°-5° C., to which 8 parts of a 10% aqueous solution of sodium nitrite were added dropwise. After stirring the resultant mixture at the same temperature for 2 hours, sulfamic acid was added to obtain a diazotized liquid mixture. After adding, to 500 parts of ice water, a solution of 2 parts of phenol dissolved in 30 parts of a 10% aqueous solution of caustic soda, the diazotized liquid mixture was added dropwise. The resulting mixture was stirred at 0°-5° C. and pH=7-9 for 2 hours, followed by its filtration. The resulting solid matter was washed with water and then dried, thereby obtaining 5.2 parts of a solid product which was a trisazo compound represented by the following formula:

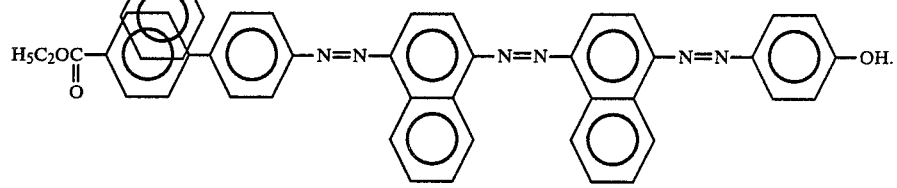

The above crude product was dissolved in toluene and then isolated and purified on a column chromatograph filled with silica gel.

Measurement of dichroic ratios:

Placed in a small beaker were 10 parts of the liquid crystal "ZLI-1840" produced by Merck & Co., Inc. and 0.05 parts of the purified dyestuff. The resultant mixture was heated to about 80° C. to form a completely clear solution. After allowing the solution to stand and to cool down, the resultant colored liquid crystal solution was sealed in a liquid crystal display device.

The display device showed a purple color while no voltage was applied. When a voltage was applied, it became substantially colorless only at its electrodes and very good contrast was produced. In addition, its dichroic ratio was 12.8 at its maximum absorption wavelength of 575 nm.

EXAMPLE 9

Three parts of the compound of the following formula:

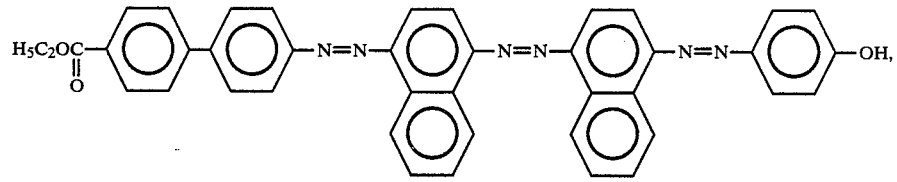

which had been synthesized in the same manner as in Example 8, were dissolved in 60 parts of DMF, followed by addition of 0.8 parts of potassium carbonate and 0.2 part of potassium iodide. After stirring the resultant mixture at 70° C. for 1 hour, 1.5 parts of n-butyl bromide were added, followed by its stirring at 80° C. for 2 hours.

After cooling it down to room temperature, it was poured in 300 parts of water. The resultant mixture was filtered, and the resulting solid matter was washed with methanol and then with water to obtain a crude product which was a compound of the following formula:

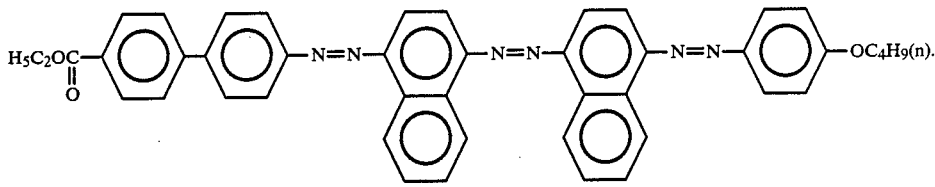

The dichroic ratio of the above-purified dyestuff in "ZLI-1840" was 14.2 at its maximum absorption wavelength of 560 nm.

EXAMPLE 10

Synthesis and purification were conducted in exactly the same manner as in Example 8 except that anilinemethanesulfonic acid was reacted instead of α-naphthylamine in the disazo step of Example 8, thereby obtaining a trisazo dyestuff of the following formula:

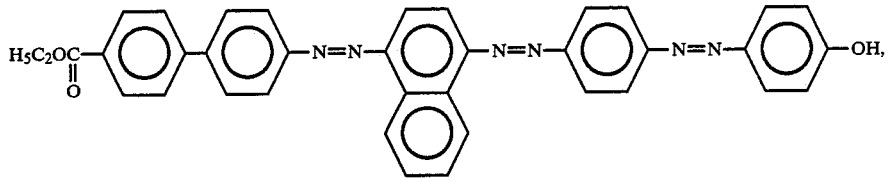

The dichroic ratio of the purified dyestuff was 13.0 at its maximum absorption wavelength of 469 nm.

EXAMPLE 11

After dissolving 4.5 parts of a disazo compound represented by the following formula:

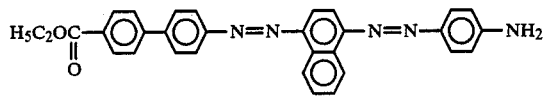

in 100 parts of DMF, 5 parts of 35% hydrochloric acid were added. The resultant mixture was stirred at room temperature for 30 minutes and then cooled to 0°–5° C., followed further by a dropwise addition of 8.3 parts of a 10% solution of sodium nitrite. After stirring the thus-obtained mixture at the same temperature for 2 hours, sulfamic acid was added to obtain a diazotized liquid mixture. The diazotized liquid mixture was added with 1.5 parts of N,N-dimethylaniline, followed by its stirring at 0°–5° C. for 2 hours. The resultant mixture was then poured in 500 parts of water, followed by its filtration. The resulting solid matter was washed with water and then dried, thereby obtaining a crude product which was a compound represented by the following formula:

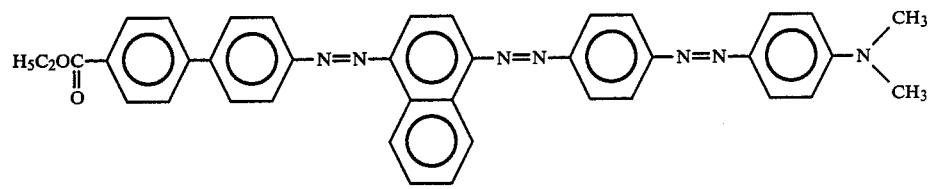

The dichroic ratio of the above-purified dyestuff in "ZLI-1840" was 15.3 at its maximum absorption wavelength of 540 nm.

EXAMPLE 12

Dispersed in 100 parts of chloroform ware 2 parts of a compound of the following formula:

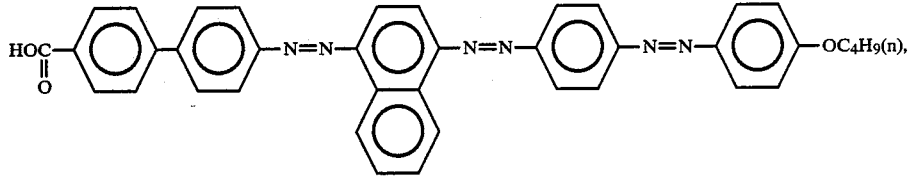

followed by an addition of 0.9 part of N,N'-dicyclohexylcarbodiimide. After stirring the resultant mixture at room temperature for 2 hours, 20 parts of ethanol were added and the resulting mixture was stirred at 50° C. for 1 hour. The reaction mixture was concentrated and n-hexane was added to the residue. The resulting mixture was filtered and the thus-obtained solid matter was dried, thereby obtaining a crude product which was a compound of the following formula:

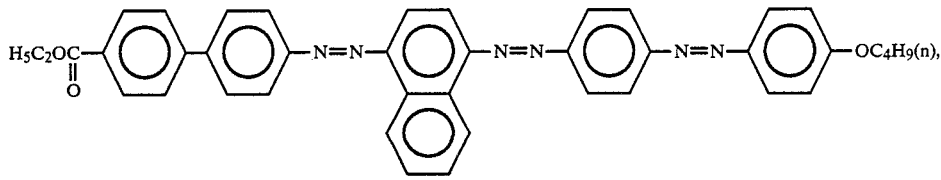

The dichroic ratio of the above-purified dyestuff in "ZLI-1840" was 16.4 at its maximum absorption wavelength of 472 nm.

EXAMPLE 13

A compound represented by the following formula:

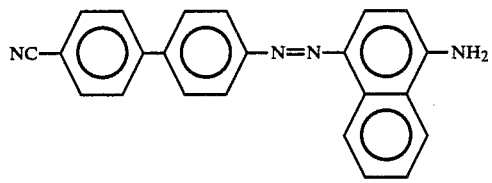

was diazotized, followed by its coupling with α-naphthylamine to obtain a compound represented by the following formula:

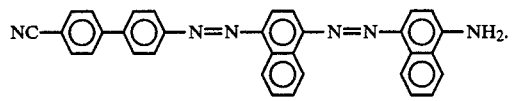

Five parts of the above compound and 3 parts of p-phenylbenzaldehyde were added to 200 parts of toluene. The resultant mixture was heated under reflux for 5 hours. During this heating, toluene was allowed to distill off gradually so that the volume of the solution was reduced to about one half. After the reaction, the solvent was distilled off under reduced pressure, followed by an addition of 150 parts of ethanol. The resultant mixture was filtered, and the thus-collected solid matter was washed with ethanol and then dried, thereby obtaining 5.6 parts of a compound represented by the following formula:

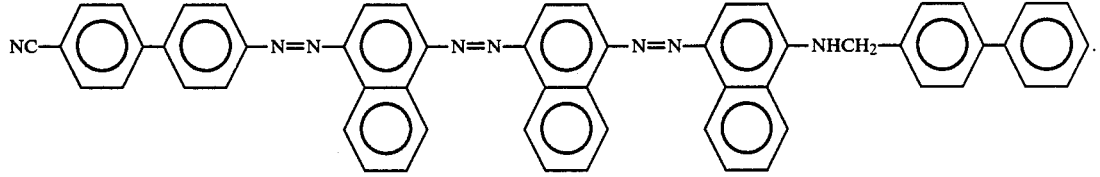

The dichroic ratio of the above-purified dyestuff in "ZLI-1840" was 16.7 at its maximum absorption wavelength of 521 nm.

EXAMPLE 14

A compound represented by the following formula:

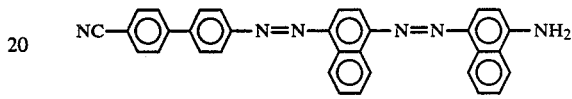

was diazotized in DMF, followed by its coupling with a compound represented by the following formula:

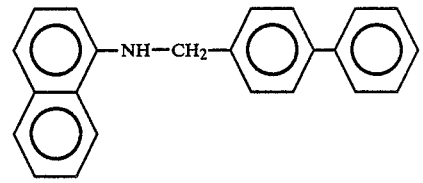

to obtain a compound represented by the following formula:

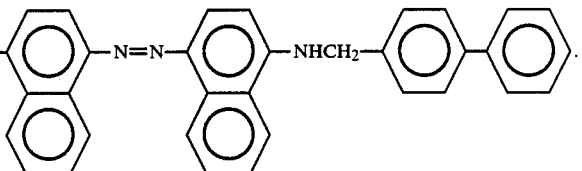

The dichroic ratio of the above-purified dyestuff in "ZLI-1840" was 19.6 at its maximum absorption wavelength of 602 nm.

EXAMPLE 15

After adding 11 parts of a compound represented by the following formula:

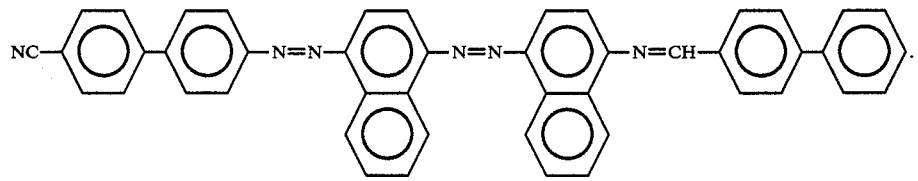

then dried, thereby obtaining 5.0 parts of a disazo dyestuff represented by the following formula:

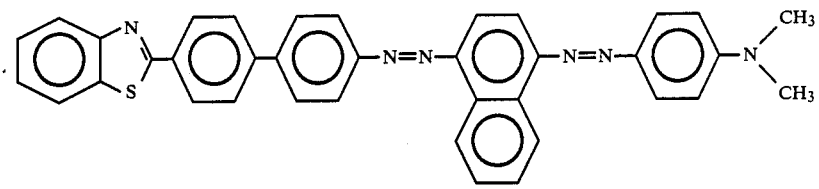

in 150 parts of water, 120 parts of 35% hydrochloric acid were added. The resultant mixture was cooled below 5° C., followed by a dropwise addition of 40 parts of a 10% aqueous solution of sodium nitrite. After stirring the mixture at the same temperature for 2 hours, sulfamic acid was added to obtain a diazotized liquid mixture. After adjusting the diazotized liquid mixture to pH=4, 50 parts of an aqueous solution containing 6.2 parts of sodium α-naphthylaminomethanesulfonate were added dropwise and the resultant mixture was stirred at 0°-5° C. for 2 hours. Thereafter, 1,000 parts of a dilute aqueous solution of caustic soda were added and the resultant mixture was stirred at 80° C. for 1 hour. After the reaction, the reaction mixture was neutralized with 35% hydrochloric acid and then filtered. The resulting solid matter was washed with water and dried, thereby obtaining 17 parts of a crude product which was a monoazo dyestuff represented by the following formula:

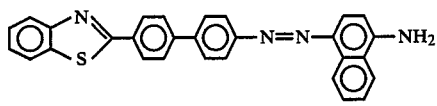

In 100 parts of N,N-dimethylformamide, 4.2 parts of the above-obtained monoazo compound were dissolved, followed by an addition of 20 parts of 35% hydrochloric acid. The resultant mixture was cooled below 5° C., followed by a dropwise addition of a 10% aqueous solution of sodium nitrite. After stirring the mixture at the same temperature for 2 hours, sulfamic acid was added to obtain a diazotized liquid mixture.

Added dropwise to the diazotized liquid mixture were a solution of 4.0 parts of N,N-dimethylaniline dissolved in 10 parts of N,N-dimethylformamide. The resultant mixture was stirred at 0°-5° C. for 2 hours. After its adjustment to pH=4, 100 parts of ice water were added and the resultant mixture was filtered. The thus-obtained solid matter was washed with water and The disazo dyestuff was dissolved in toluene and then isolated and purified on a column chromatograph filled with silica gel, thereby obtaining the disazo dyestuff.

In a small beaker, 0.1 part of the above disazo dyestuff was added to a liquid crystal mixture which consisted of 43% of 4-n-pentyl-4'-cyanobiphenyl, 17% of n-propoxy-4'-cyanobiphenyl, 13% of 4-n-pentoxy-4'-cyanobiphenyl, 17% of 4-n-octoxy-4'-cyanobiphenyl and 10% of 4-n-pentyl-4'-cyanoterphenyl. The resultant mixture was heated to about 80° C. to convert it into a completely clear solution. After allowing the content to stand and to cool down, the resultant colored liquid crystal solution was sealed in a liquid crystal display device.

The display device showed a purple color while no voltage was applied. When a voltage was applied, it became colorless only at its electrodes and very good contrast was produced. In addition, its dichroic ratio was 13.8 at its maximum absorption wavelength of 545 nm.

EXAMPLE 16

In the same manner as in Example 15, the compound represented by the following formula:

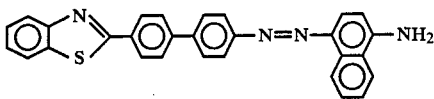

was diazotized, followed by its coupling at pH=8-9 with phenol to obtain a compound represented by the following formula:

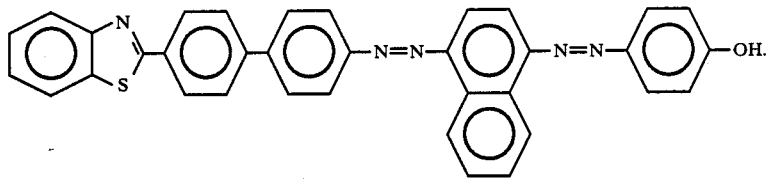

Then, 0.5 part of the above compound was dissolved under heat in 50 parts of N,N-dimethylformamide, followed by addition of 2.0 parts of pyridine and 0.8 part of propionyl chloride. The resultant mixture was stirred at 80° C. for 3 hours. After cooling the reaction mixture down to room temperature, 100 parts of water were added. The thus-obtained mixture was filtered and the resulting solid matter was washed with water and then dried, thereby obtaining 0.5 parts of a disazo dyestuff represented by the following formula:

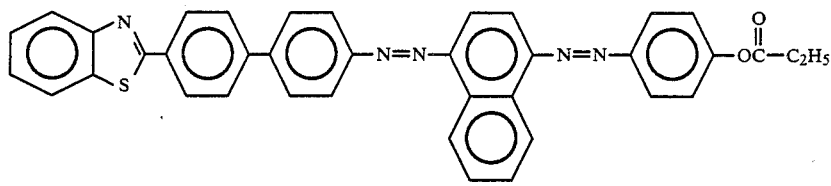

The dichroic ratio of the above-purified dyestuff in a liquid crystal "E-8" produced by BDH Corporation was found to be 11.4 at its maximum absorption wavelength of 455 nm.

The structural formulae and dichroic ratios of further dichroic azo dyestuffs of this invention will hereinafter be given in Table 1 through Table 5.

TABLE 1

| Ex. No. | Structural formula | Dichroic ratio/ dissolved color (E-8) |
|---|---|---|
| 17 | CH₃(CH₂)₄—⌬—OC(O)—⌬—⌬—N=N—⌬(naphthyl)—N=N—⌬—OH | 9.0/yellow |
| 18 | CH₃(CH₂)₄—⌬—OC(O)—⌬—⌬—N=N—⌬(naphthyl)—N=N—⌬—OCC₂H₅(O) | 10.2/yellow |
| 19 | H₅C₂OC(O)—⌬—⌬—N=N—⌬(naphthyl)—N=N—⌬—N(CH₃)₂ | 12.4/bluish red |
| 20 | CH₃(CH₂)₄—⌬—OC(O)—⌬—⌬—N=N—⌬(naphthyl)—N=N—⌬—N(CH₃)₂ | 11.0/bluish red |
| 21 | CH₃(CH₂)₄—⌬—OC(O)—⌬—⌬—N=N—⌬(naphthyl)—N=N—⌬—OC(O)—⌬—(CH₂)₈CH₃ | 9.8/yellow |
| 22 | H₅C₂—OC(O)—⌬—⌬—N=N—⌬(naphthyl)—N=N—⌬(naphthyl)—N=N—⌬—OC(O)—C₂H₅ | 12.8/red |
| 23 | H₅C₂OC(O)—⌬—⌬—N=N—⌬(naphthyl)—N=N—⌬(naphthyl)—N=N—⌬—N(CH₃)₂ | 15.1/blue |
| 24 | H₅C₂—OC(O)—⌬—⌬—N=N—⌬(naphthyl)—N=N—⌬(naphthyl)—N=N—⌬—OC(O)—⌬—(CH₂)₅CH₃ | 12.5/red |
| 25 | H₅C₂—OC(O)—⌬—⌬—N=N—⌬(naphthyl)—N=N—⌬(naphthyl)—N=N—⌬—OC₂H₅ | 13.2/red |
| 26 | H₅C₂OC(O)—⌬—⌬—N=N—⌬(naphthyl)—N=N—⌬(naphthyl)—N=N—⌬—O—CH₂—⌬—(CH₂)₆CH₃ | 12.9/red |

TABLE 1-continued

| Ex. No. | Structural formula | Dichroic ratio/ dissolved color (E-8) |
|---|---|---|
| 27 | CH$_3$(CH$_2$)$_4$—⟨Ph⟩—O—C(=O)—⟨Ph⟩—⟨Ph⟩—N=N—⟨Naph⟩—N=N—⟨Naph⟩—N=N—⟨Ph⟩—OH | 11.5/red |
| 28 | CH$_3$(CH$_2$)$_4$—⟨Ph⟩—O—C(=O)—⟨Ph⟩—⟨Ph⟩—N=N—⟨Naph⟩—N=N—⟨Naph⟩—N=N—⟨Ph⟩—OC(=O)—C$_2$H$_5$ | 12.1/red |
| 29 | CH$_3$(CH$_2$)$_4$—⟨Ph⟩—O—C(=O)—⟨Ph⟩—⟨Ph⟩—N=N—⟨Naph⟩—N=N—⟨Naph⟩—N=N—⟨Ph⟩—N(CH$_3$)$_2$ | 13.8/blue |
| 30 | CH$_3$(CH$_2$)$_4$—⟨Ph⟩—O—C(=O)—⟨Ph⟩—⟨Ph⟩—N=N—⟨Naph⟩—N=N—⟨Naph⟩—N=N—⟨Ph⟩—OC$_4$H$_9$ | 12.6/red |
| 31 | H$_5$C$_2$—O—C(=O)—⟨Ph⟩—⟨Ph⟩—N=N—⟨Naph(Cl)⟩—N=N—⟨Ph⟩—N=N—⟨Ph⟩—OC$_4$H$_9$ | 12.8/red |
| 32 | H$_5$C$_2$—O—C(=O)—⟨Ph⟩—⟨Ph⟩—N=N—⟨Naph⟩—N=N—⟨Ph(OCH$_3$)⟩—N=N—⟨Ph⟩—N(CH$_3$)$_2$ | 13.8/blue |
| 33 | CH$_3$(CH$_2$)$_4$—⟨Ph⟩—O—C(=O)—⟨Ph⟩—⟨Ph⟩—N=N—⟨Naph(CN)⟩—N=N—⟨Naph⟩—N=N—⟨Ph⟩—OC$_4$H$_9$ | 11.8/red |
| 34 | CH$_3$(CH$_2$)$_4$—⟨Ph⟩—O—C(=O)—⟨Ph⟩—⟨Ph⟩—N=N—⟨Naph⟩—N=N—⟨Ph(CH$_3$)⟩—N=N—⟨Ph⟩—N(CH$_3$)$_2$ | 13.1/blue |
| 35 | H$_5$C$_2$OC(=O)—⟨Ph⟩—⟨Ph⟩—N=N—⟨Naph⟩—N=N—⟨Naph⟩—OH | 10.4/red |
| 36 | H$_5$C$_2$OC(=O)—⟨Ph⟩—⟨Ph⟩—N=N—⟨Naph⟩—N=N—⟨Naph⟩—OC(=O)—C$_2$H$_5$ | 12.9/red |
| 37 | H$_5$C$_2$OC(=O)—⟨Ph⟩—⟨Ph⟩—N=N—⟨Naph⟩—N=N—⟨Naph⟩—N(CH$_3$)$_2$ | 13.6/reddish blue |
| 38 | H$_5$C$_2$OC(=O)—⟨Ph⟩—⟨Ph⟩—N=N—⟨Naph⟩—N=N—⟨Naph⟩—OC$_4$H$_9$ | 13.2/red |

TABLE 1-continued

| Ex. No. | Structural formula | Dichroic ratio/ dissolved color (E-8) |
|---|---|---|
| 39 | $H_5C_2OC(O)$—⌬—⌬—N=N—(naphthyl)—N=N—(naphthyl)—NH—CH$_2$—⌬—⌬ | 13.5/reddish blue |
| 40 | $CH_3(CH_2)_4$—⌬—OC(O)—⌬—⌬—N=N—(naphthyl)—N=N—(naphthyl)—OH | 10.2/red |
| 41 | $CH_3(CH_2)_4$—⌬—OC(O)—⌬—⌬—N=N—(naphthyl)—N=N—(naphthyl)—OC(O)—$C_2H_5$ | 12.5/red |
| 42 | $CH_3(CH_2)_4$—⌬—OC(O)—⌬—⌬—N=N—(naphthyl)—N=N—(naphthyl)—OC$_4$H$_9$ | 12.8/red |
| 43 | $CH_3(CH_2)_4$—⌬—OC(O)—⌬—⌬—N=N—(naphthyl)—N=N—(naphthyl)—N(CH$_3$)$_2$ | 13.1/reddish blue |
| 44 | $CH_3(CH_2)_4$—⌬—OC(O)—⌬—⌬—N=N—(naphthyl)—N=N—(naphthyl)—NH—CH$_2$—⌬—⌬ | 13.0/reddish blue |
| 45 | $H_5C_2OC(O)$—⌬—⌬—N=N—(naphthyl, CH$_3$)—N=N—(naphthyl)—OC$_4$H$_9$ | 12.0/red |
| 46 | $H_5C_2OC(O)$—⌬—⌬—N=N—(naphthyl, CH$_3$O)—N=N—(naphthyl)—N(CH$_3$)$_2$ | 12.8/bluish red |
| 47 | $CH_3(CH_2)_4$—⌬—OC(O)—⌬—⌬—N=N—(naphthyl)—N=N—(naphthyl, Cl)—OC$_4$H$_9$ | 11.5/red |
| 48 | $CH_3(CH_2)_4$—⌬—OC(O)—⌬—⌬—N=N—(naphthyl, CN)—N=N—(naphthyl)—N(CH$_3$)$_2$ | 11.3/blue |

TABLE 2

| Ex. No. | Structural formula | Dichroic ratio/ dissolved color (ZLI-1840) |
|---|---|---|
| 49 | $H_5C_2OC(O)$—⌬—⌬—N=N—(naphthyl)—N=N—⌬—N=N—(naphthyl)—N(H)(CH$_2$—⌬—OC$_2$H$_5$) | 14.2/blue |

TABLE 2-continued

| Ex. No. | Structural formula | Dichroic ratio/ dissolved color (ZLI-1840) |
|---|---|---|
| 50 | $H_5C_2OC(O)$-⌬-⌬-N=N-(naphthyl)-N=N-⌬-N=N-(naphthyl)-NH-$CH_2$-⌬-$C_2H_5$ | 13.6/blue |
| 51 | $(n)H_9C_4OC(O)$-⌬-⌬-N=N-(naphthyl)-N=N-⌬-N=N-⌬-NH-$CH_2$-⌬-⌬ | 16.2/purple |
| 52 | $(n)C_5H_{11}$-(cyclohexyl-H)-OC(O)-⌬-⌬-N=N-(naphthyl)-N=N-⌬-N=N-⌬-O-C(O)-⌬-$C_8H_{17}(n)$ | 13.5/orange |

TABLE 3

| Ex. No. | Structural formula | Dichroic ratio/ dissolved color (ZLI-1565) |
|---|---|---|
| 53 | H₅C₂OC(=O)—⟨phenyl⟩—⟨phenyl⟩—N=N—⟨naphthyl⟩—N=N—⟨naphthyl⟩—NHCH₂—⟨phenyl⟩—C₄H₉ | 17.9/bluish purple |
| 54 | H₅C₂OC(=O)—⟨phenyl⟩—⟨phenyl⟩—N=N—⟨naphthyl⟩—N=N—⟨naphthyl⟩—NHCH₂—⟨phenyl⟩—OC(=O)C₂H₅ | 17.3/bluish purple |
| 55 | H₅C₂OC(=O)—⟨phenyl⟩—⟨phenyl⟩—N=N—⟨naphthyl(OCH₃)⟩—N=N—⟨naphthyl⟩—NHCH₂—⟨phenyl⟩—C(=O)O—⟨phenyl⟩—C₂H₅ | 16.8/bluish purple |
| 56 | H₅C₂OC(=O)—⟨phenyl⟩—⟨phenyl⟩—N=N—⟨naphthyl⟩—N(CH₂—CH₃)—⟨phenyl⟩—OCH₂CH₂OC₂H₅ | 17.4/bluish purple |
| 57 | H₅C₂OC₂H₄OC(=O)—⟨phenyl⟩—⟨phenyl⟩—N=N—⟨naphthyl⟩—NHCH₂—⟨phenyl⟩—O—CH₂O—C₂H₅ | 15.1/purple |

TABLE 3-continued

| Ex. No. | Structural formula | Dichroic ratio/ dissolved color (ZLI-1565) |
|---|---|---|
| 58 | (structure) | 14.7/purple |
| 59 | (structure) | 14.3/purple |
| 60 | (structure) | 14.6/purple |
| 61 | (structure) | 15.5/purple |

TABLE 3-continued

| Ex. No. | Structural formula | Dichroic ratio/ dissolved color (ZLI-1565) |
|---|---|---|
| 62 | benzoxazole–phenyl–phenyl–N=N–naphthalene–N=N–C₆H₄–N(CH₃)₂ | 14.3/purple |
| 63 | benzoxazole–phenyl–phenyl–N=N–naphthalene–N=N–C₆H₄–N(C₄H₉)₂ | 13.8/purple |
| 64 | 5-methylbenzoxazole–phenyl–phenyl–N=N–naphthalene–N=N–C₆H₄–N(CH₃)₂ | 13.0/purple |
| 65 | 5-methylbenzoxazole–phenyl–phenyl–N=N–naphthalene–N=N–C₆H₄–OC(=O)C₂H₅ | 9.9/orange |
| 66 | 5-methylbenzoxazole–phenyl–phenyl–N=N–naphthalene–N=CH–C₆H₄–C₆H₅ | 11.5/orange |

TABLE 3-continued
| Ex. No. | Structural formula | Dichroic ratio/ dissolved color (ZLI-1565) |
|---|---|---|
| 67 | 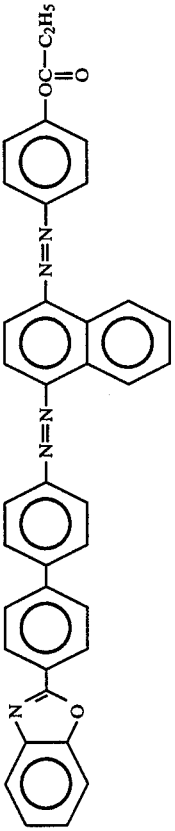 | 11.2/orange |
| 68 | 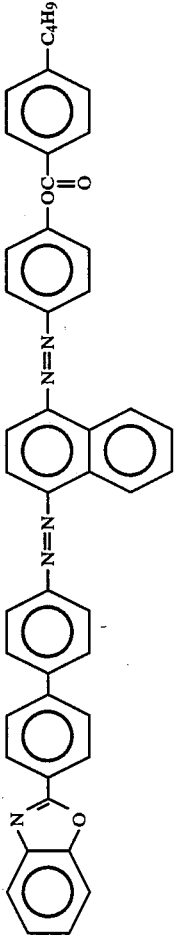 | 9.9/orange |
| 69 | 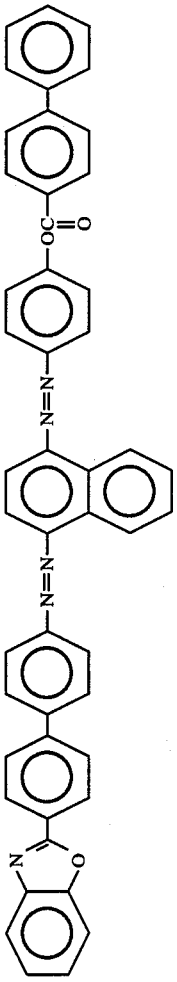 | 12.0/orange |
| 70 | 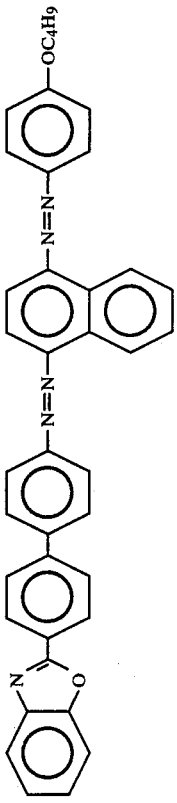 | 10.5/orange |
| 71 | 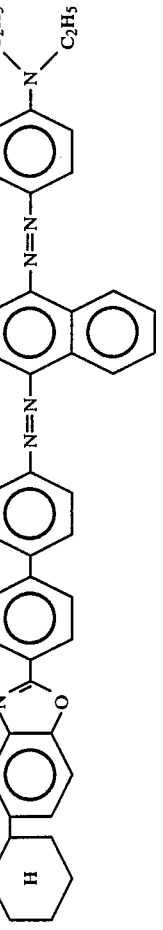 | 13.5/purple |

TABLE 3-continued

| Ex. No. | Structural formula | Dichroic ratio/ dissolved color (ZLI-1565) |
|---|---|---|
| 72 | H₅C₂OCH₂CH₂O—[benzoxazole]—[phenyl]—[phenyl]—N=N—[naphthyl]—[phenyl]—OCCH₂CH₂CH(CH₃)CH₃ with C=O | 11.5/orange |
| 73 | F,F-[benzoxazole]—[phenyl]—[phenyl]—N=N—[naphthyl]—[phenyl]—N(CH₃)₂ | 11.4/purple |
| 74 | [benzoxazole]—[phenyl]—[phenyl]—N=N—[naphthyl]—[phenyl]—N=CH—[phenyl]—OC₄H₉ | 10.8/orange |
| 75 | [benzoxazole]—[phenyl]—[phenyl]—N=N—[naphthyl]—[naphthyl]—N=N—[naphthyl]—NHCH₂—[biphenyl]—OC₄H₉ | 19.1/bluish purple |
| 76 | [benzoxazole]—[phenyl]—[phenyl]—N=N—[naphthyl]—[naphthyl]—N=N—[naphthyl]—N(CH₃)—CH₂—[phenyl]—C₂H₅ | 18.2/bluish purple |

TABLE 3-continued

| Ex. No. | Structural formula | Dichroic ratio/ dissolved color (ZLI-1565) |
|---|---|---|
| 77 | benzoxazole–C₆H₄–C₆H₄–N=N–naphthyl–N=N–naphthyl–NHCH₂–C₆H₄–COOC₂H₅ | 17.6/bluish purple |
| 78 | benzoxazole–C₆H₄–C₆H₄–N=N–(Cl-naphthyl)–N=N–naphthyl–NHCH₂–C₆H₄–N(CH₃)₂ | 17.3/bluish purple |
| 79 | (H₅C₂O–C₆H₄–)benzoxazole–C₆H₄–C₆H₄–N=N–naphthyl–N=N–naphthyl–NHCH₂–C₆H₄–O–CO–C₆H₄–C₂H₅ | 17.3/bluish purple |
| 80 | benzoxazole–C₆H₄–C₆H₄–N=N–(CH₃,CH₃-naphthyl)–N=N–naphthyl–NHCH₂–C₆H₄–CN | 16.4/bluish purple |

TABLE 3-continued

| Ex. No. | Structural formula | Dichroic ratio/ dissolved color (ZLI-1565) |
|---|---|---|
| 81 | benzoxazole–C6H4–C6H4–N=N–naphthalene–N=N–naphthalene–N(CH3)(CH2–)–C6H4–COO–C6H4–C2H5 | 17.6/bluish purple |
| 82 | 5-Cl-6-CH3-benzoxazole–C6H4–C6H4–N=N–naphthalene–N=N–naphthalene–N(CH3)(CH2–C6H5) | 15.8/bluish purple |
| 83 | benzoxazole–C6H4–C6H4–N=N–naphthalene–N=N–C6H4–NHCH2–C6H4–OC4H9 | 18.0/purple |
| 84 | benzoxazole–C6H4–C6H4–N=N–naphthalene–N=N–C6H4–N(CH3)(CH2–)–C6H4–OCO–C6H4–C2H5 | 17.4/purple |
| 85 | 5-(4-C2H5-cyclohexyl)-benzoxazole–C6H4–C6H4–N=N–naphthalene–N=N–C6H4–NHCH2–C6H4–Cl | 15.8/purple |

TABLE 3-continued

| Ex. No. | Structural formula | Dichroic ratio/ dissolved color (ZLI-1565) |
|---|---|---|
| 86 | benzoxazole-C(OCH$_3$)(OC$_2$H$_4$OC$_2$H$_5$)—C$_6$H$_4$—C$_6$H$_4$—N=N—naphthalene—N=N—C$_6$H$_4$—NHCH$_2$—C$_6$H$_4$—OC$_2$H$_4$OC$_2$H$_5$ | 14.6/purple |
| 87 | 5,6-dicyanobenzoxazole—C$_6$H$_4$—C$_6$H$_4$—N=N—naphthalene—N=N—C$_6$H$_4$—NHCH$_2$—C$_6$H$_4$—O—C$_6$H$_4$—C$_4$H$_9$ | 15.2/purple |
| 88 | 6-(4-ethylbenzyl)benzoxazole—C$_6$H$_4$—C$_6$H$_4$—N=N—naphthalene—N=N—C$_6$H$_4$—N(CH$_3$)—CH$_2$—C$_6$H$_4$—O—C(=O)—C$_6$H$_4$—C$_2$H$_5$ | 15.7/purple |
| 89 | benzoxazole—C$_6$H$_4$—C$_6$H$_4$—N=N—(2,5-dimethoxynaphthalene)—N=N—C$_6$H$_4$—N(CH$_2$)$_2$—C$_6$H$_4$—O—C(=O)—C$_6$H$_4$—OC$_4$H$_9$ | 15.4/purple |

TABLE 3-continued

| Ex. No. | Structural formula | Dichroic ratio/ dissolved color (ZLI-1565) |
|---|---|---|
| 90 | (structure) | 15.9/purple |
| 91 | (structure) | 14.4/yellow |
| 92 | (structure) | 14.1/yellow |
| 93 | (structure) | 16.3/purple |

TABLE 4

| Ex. No. | Structural formula | Dichroic ratio/ dissolved color (E-8) |
|---|---|---|
| 94 | benzothiazole–C₆H₄–C₆H₄–N=N–naphthyl–N=N–C₆H₄–N=N–C₆H₄–OC₄H₉ | 15.2/yellow |
| 95 | benzothiazole–C₆H₄–C₆H₄–N=N–naphthyl–N=N–C₆H₄–N=N–C₆H₄–N(CH₃)₂ | 16.9/purple |
| 96 | benzothiazole–C₆H₄–C₆H₄–N=N–naphthyl–N=N–C₆H₄–N=N–C₆H₄–NHCH₂–C₆H₄–C₂H₅ | 16.8/purple |
| 97 | benzothiazole–C₆H₄–C₆H₄–N=N–naphthyl–N=N–naphthyl–OC₄H₉ | 12.2/red |
| 98 | benzothiazole–C₆H₄–C₆H₄–N=N–naphthyl–N=N–naphthyl–OC(O)C₂H₅ | 12.6/red |
| 99 | benzothiazole–C₆H₄–C₆H₄–N=N–naphthyl–N=N–naphthyl–NHCH₂–C₆H₄–OC₂H₅ | 15.2/purple |
| 100 | benzothiazole–C₆H₄–C₆H₄–N=N–naphthyl–N=N–naphthyl–N=N–C₆H₄–OC₄H₉ | 15.6/red |
| 101 | benzothiazole–C₆H₄–C₆H₄–N=N–naphthyl–N=N–naphthyl–N=N–C₆H₄–OC(O)C₂H₅ | 14.6/red |
| 102 | benzothiazole–C₆H₄–C₆H₄–N=N–naphthyl–N=N–naphthyl–N=N–C₆H₄–N(CH₃)₂ | 17.1/blue |
| 103 | benzothiazole–C₆H₄–C₆H₄–N=N–naphthyl–N=N–naphthyl–N=N–C₆H₄–NHCH₂–C₆H₄–C₂H₅ | 16.9/blue |
| 104 | benzothiazole–C₆H₄–C₆H₄–N=N–naphthyl–N=CH–C₆H₄–C₆H₅ | 13.3/yellow |
| 105 | benzothiazole–C₆H₄–C₆H₄–N=N–naphthyl–N=N–naphthyl–N=CH–C₆H₄–C₆H₅ | 14.2/red |

TABLE 5

| Ex. No. | Structural formula | Dichroic ratio/ max. absorption wavelength (ZLI-1840) |
|---|---|---|
| 106 | NC—⟨◯⟩—⟨◯⟩—N=N—⟨◯⟩(naphthyl)—N=N—⟨◯⟩—OC$_4$H$_9$ | 14.6/452 nm |
| 107 | NC—⟨◯⟩—⟨◯⟩—N=N—⟨◯⟩(naphthyl)—N=N—⟨◯⟩—O–C(=O)–⟨◯⟩ | 15.6/440 nm |
| 108 | NC—⟨◯⟩—⟨◯⟩—N=N—⟨◯⟩(naphthyl)—N=N—⟨◯⟩—O–C(=O)–C$_2$H$_5$ | 13.6/441 nm |
| 109 | NC—⟨◯⟩—⟨◯⟩—N=N—⟨◯⟩(naphthyl)—N=N—⟨◯⟩(Cl)—O–C(=O)–⟨◯⟩—C$_3$H$_7$ | 10.6/440 nm |
| 110 | NC—⟨◯⟩—⟨◯⟩—N=N—⟨◯⟩(naphthyl)—N=N—⟨◯⟩—N(CH$_3$)$_2$ | 14.2/542 nm |
| 111 | NC—⟨◯⟩—⟨◯⟩—N=N—⟨◯⟩(naphthyl)—N=N—⟨◯⟩—NHCH$_2$—⟨◯⟩—⟨◯⟩ | 14.9/512 nm |
| 112 | NC—⟨◯⟩—⟨◯⟩—N=N—⟨◯⟩(naphthyl)—N=N—⟨◯⟩(naphthyl)—NHCH$_2$—⟨◯⟩—⟨◯⟩ | 16.3/572 nm |
| 113 | NC—⟨◯⟩—⟨◯⟩—N=N—⟨◯⟩(naphthyl)—N=CH—⟨◯⟩—N(CH$_3$)$_2$ | 14.9/476 nm |
| 114 | NC—⟨◯⟩—⟨◯⟩—N=N—⟨◯⟩(naphthyl)—N=N—⟨◯⟩—N=N—⟨◯⟩—N(CH$_3$)$_2$ | 18.9/561 nm |
| 115 | NC—⟨◯⟩—⟨◯⟩—N=N—⟨◯⟩(naphthyl)—N=N—⟨◯⟩—N=N—⟨◯⟩(naphthyl)—NHCH$_2$—⟨◯⟩—⟨◯⟩ | 19.3/568 nm |
| 116 | NC—⟨◯⟩—⟨◯⟩—N=N—⟨◯⟩(naphthyl)—N=CH—⟨◯⟩—⟨◯⟩ | 14.8/441 m |
| 117 | NC—⟨◯⟩—⟨◯⟩—N=N—⟨◯⟩(naphthyl)—N=N—⟨◯⟩(naphthyl)—N=CH—⟨◯⟩—N(CH$_3$)$_2$ | 18.5/532 nm |

TABLE 5-continued

| Ex. No. | Structural formula | Dichroic ratio/ max. absorption wavelength (ZLI-1840) |
|---|---|---|
| 118 | 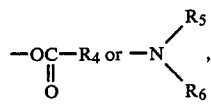 ... | 18.1/580 nm |
| 119 | ... | 17.2/452 |
| 120 | ... | 17.5/516 nm |

We claim:

1. A dichroic azo dyestuff represented by the following formula:

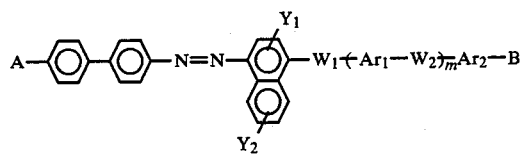

wherein A is —CN, —COOR$_1$,

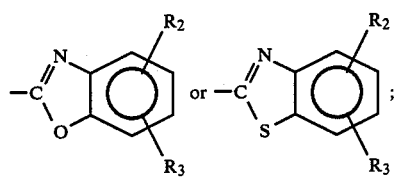

R$_1$ is alkyl, alkoxyalkyl, phenyl, cyclohexyl, or phenyl or cyclohexyl which are substituted with alkyl or alkoxy at the p-position thereof; R$_2$ and R$_3$ are individually hydrogen alkyl, cycloalkyl, alkoxy, alkoxyalkoxy, cycloalkyloxyalkoxy, aryloxyalkoxy, aryl, halogen, cyano or dialkylamino; Y$_1$ and Y$_2$ are individually hydrogen, halogen, alkyl, alkoxy, cyano or hydroxyl; Ar$_1$ and Ar$_2$ are individually

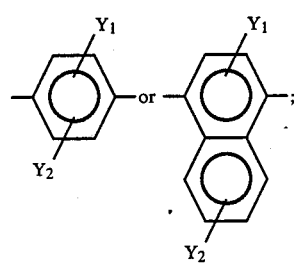

W$_1$ and W$_2$ are individually —N=N— or —N=CH—, but W$_1$ is —N=N— when W$_2$ is —N=CH—, m is 0 or 1, but m is 0 when W$_1$ is —N=CH—; and B is hydroxyl, alkoxy, alkoxyalkoxy, p-alkylbenzyloxy,

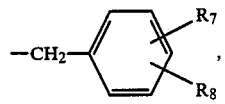

but B is hydrogen, halogen, cyano,

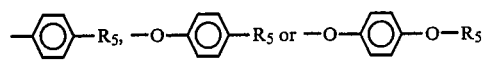

when W$_1$ or W$_2$ is —N=CN—, R$_4$ is alkyl, phenyl or cyclohexyl unsubstituted or substituted with alkyl or alkoxy at the p-position thereof, R$_5$ is hydrogen or alkyl, R$_6$ is alkyl or

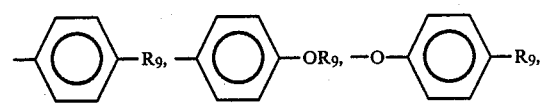

R$_7$ and R$_8$ are individually hydrogen, halogen, hydroxyl, cyano, alkyl, dialkylamino, alkoxy, alkoxyalkoxy,

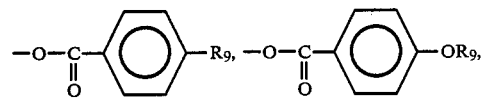

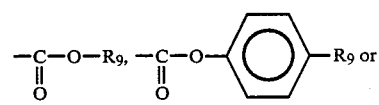

-continued

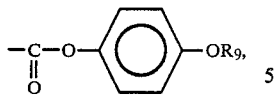

and R$_9$ is hydrogen or alkyl.

2. The dichroic azo dyestuff as claimed in claim 1, wherein A is —CN.

3. The dichroic azo dyestuff as claimed in claim 1, wherein A is —COOR$_1$.

4. The dichroic azo dyestuff as claimed in claim 1, wherein A is

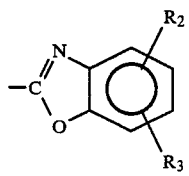

5. The dichroic azo dyestuff as claimed in claim 1, wherein A is

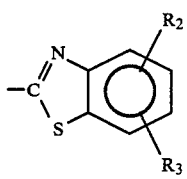

6. The dichroic azo dyestuff as claimed in claim 1, wherein R$_1$ is —CH$_3$, —C$_2$H$_5$, —(CH$_2$)$_3$CH$_3$, —(CH$_2$)$_7$CH$_3$, —C$_2$H$_4$CH(CH$_3$)CH$_2$—(CH$_3$)$_3$, —(CH$_2$)$_{10}$CH$_3$,

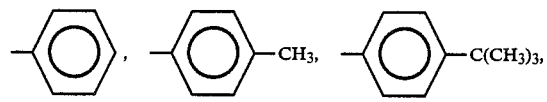

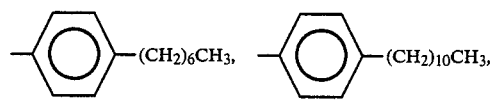

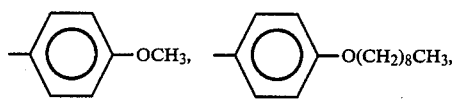

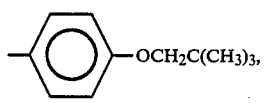

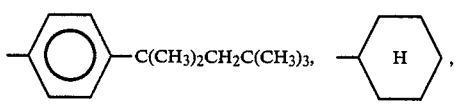

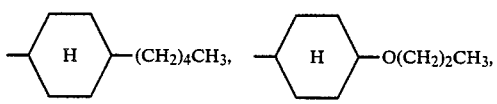

-continued

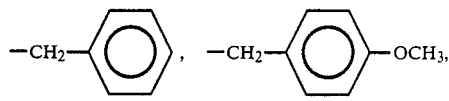

—C$_2$H$_4$OC$_2$H$_5$, or —C$_2$H$_4$O(CH$_2$)$_3$CH$_3$.

7. A dichroic azo dyestuff as claimed in claim 1 or 2, wherein the carbon number of each alkyl group is 15 or smaller.

8. A dichroic azo dyestuff as claimed in claim 1, wherein R$_2$ and R$_3$ are individually a hydrogen atom, —CH$_3$, —C$_2$H$_5$, —(CH$_2$)$_2$CH$_3$, —CH(CH$_3$)$_2$, —(CH$_2$)$_7$CH$_3$, —CH$_2$C(CH$_3$)$_3$, —(CH$_2$)$_{10}$CH$_3$, —OCH$_3$, —OC$_2$H$_5$, —O(CH$_2$)$_7$CH$_3$, —OC$_2$H$_4$CH(CH$_3$)CH$_2$C(CH$_3$)$_3$,

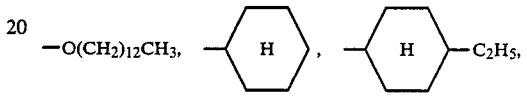

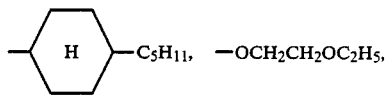

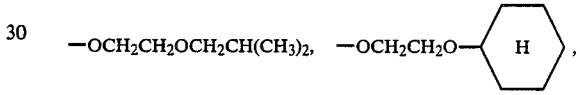

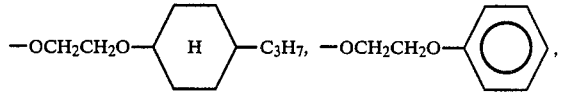

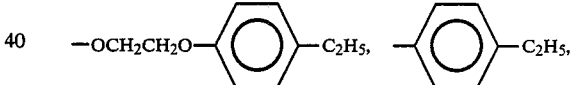

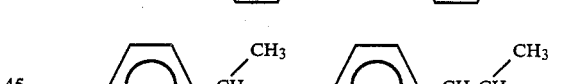

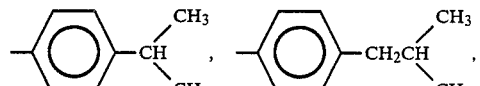

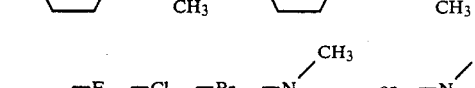

—F, —Cl, —Br, 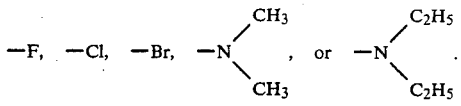

9. The dichroic azo dyestuff as claimed in claim 1, wherein Y$_1$ and Y$_2$ are individually a hydrogen atom, —Cl, —Br, —I, —F, —CN, —OH, —OCH$_3$ or —CH$_3$.

10. The dichroic azo dyestuff as claimed in claim 1, wherein Y$_1$ and Y$_2$ are both hydrogen atoms.

11. The dichroic azo dyestuff as claimed in claim 1, wherein Ar$_1$ and Ar$_2$ are individually

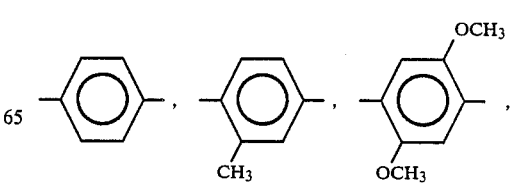

-continued

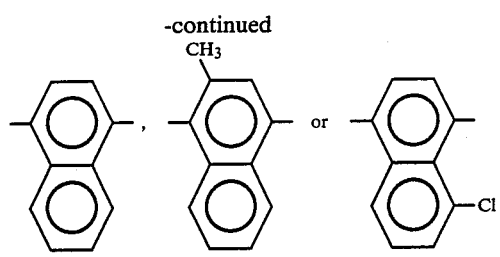

12. The dichroic azo dyestuff as claimed in claim 1, wherein B is a hydroxyl, —OCH$_3$, —OC$_2$H$_5$, —OC$_4$H$_9$(n), —OC(CH$_3$)$_3$, —O(CH$_2$)$_5$CH$_3$, —O(CH$_2$)$_7$CH$_3$, —OC$_2$H$_4$CH(CH$_3$)CH$_2$C(CH$_3$)$_3$, —O(CH$_2$)$_{12}$CH$_3$, —OCH$_2$CH$_2$OC$_2$H$_5$, —OCH$_2$CH$_2$OCH$_2$CH(CH$_3$)$_2$,

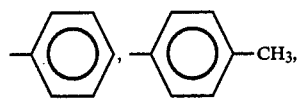

—N(CH$_3$)$_2$ or —N(C$_2$H$_5$)$_2$.

13. The dichroic azo dyestuff as claimed in claim 1, wherein when B is represented by

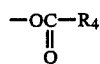

R$_4$ is —CH$_3$, —C$_2$H$_5$, —(CH$_2$)$_3$CH$_3$, —(CH$_2$)$_7$CH$_3$, —C$_2$H$_4$CH(CH$_3$)CH$_2$—(CH$_3$)$_3$, —(CH$_2$)$_{10}$CH$_3$,

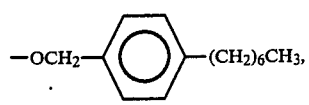

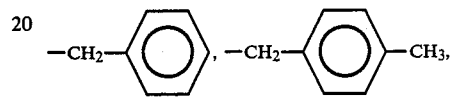

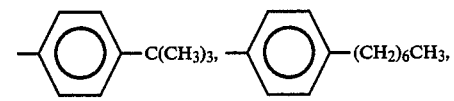

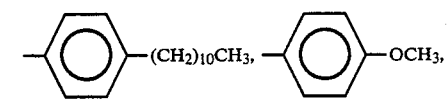

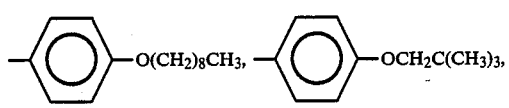

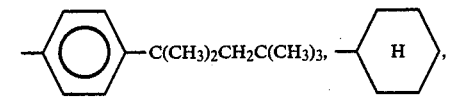

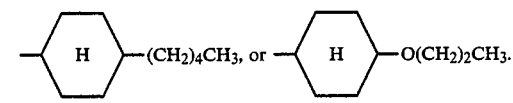

14. The dichroic azo dyestuff as claimed in claim 1, wherein when B is represented by

R$^5$ is a hydrogen atom, —CH$_3$, —C$_2$H$_5$ or —C$_4$H$_9$.

15. The dichroic azo dyestuff as claimed in claim 1, wherein when B is represented by

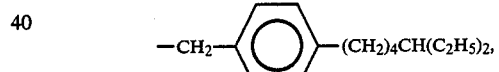

R$^6$ is —CH$_3$, —C$_2$H$_5$, —C$_4$H$_9$(n), —CH$_2$CH(CH$_3$)$_2$,

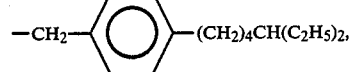

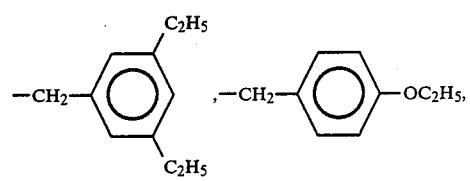

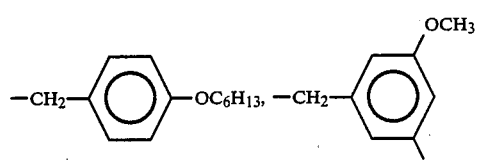

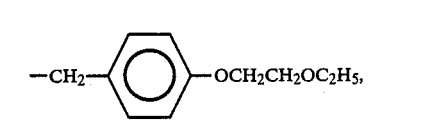

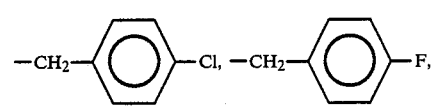

-continued

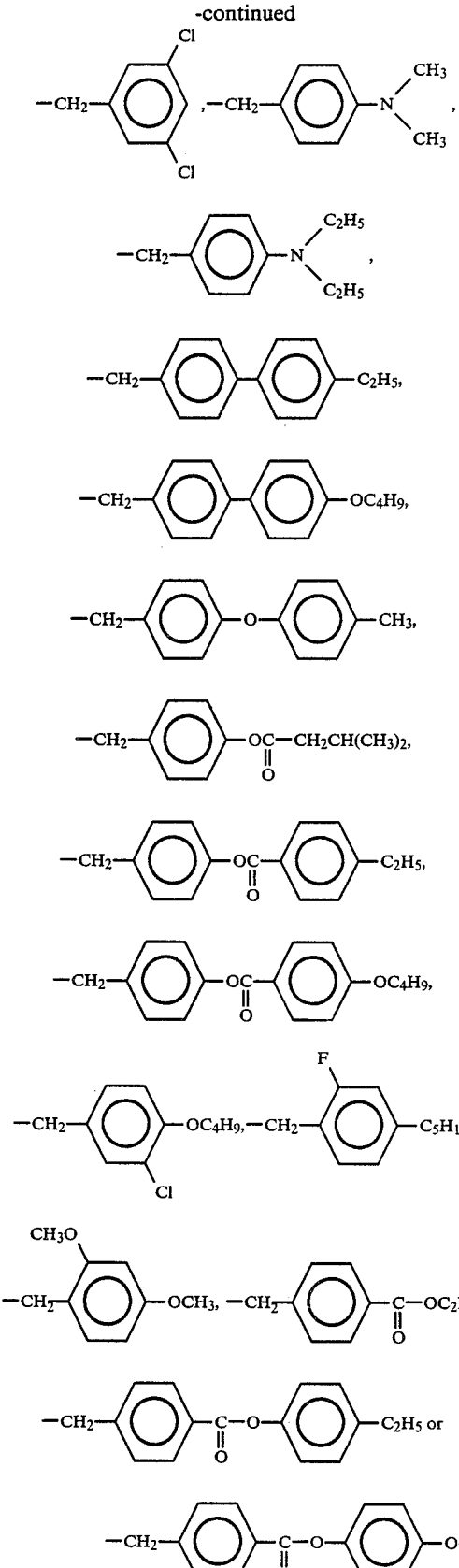

16. A liquid crystal composition containing, in a form dissolved in a liquid crystal, at least one of dichroic azo dyestuffs represented by the following formula:

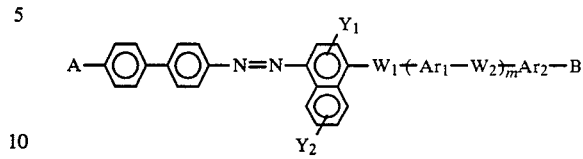

wherein A is —CN, —COOR$_1$,

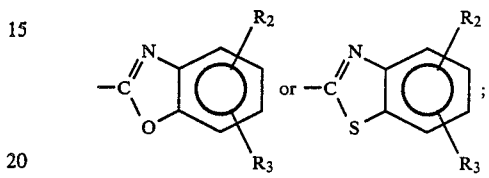

R$_1$ is alkyl, alkoxyalkyl, phenyl, cyclohexyl, or phenyl or cyclohexyl which are substituted with alkyl or alkoxy at the p-position thereof; R$_2$ and R$_3$ are individually hydrogen, alkyl, cycloalkyl, alkoxy, alkoxyalkoxy, cycloalkyloxyalkoxy, aryloxyalkoxy, aryl, halogen, cyano or dialkylamino; Y$_1$ and Y$_2$ denote individually hydrogen; halogen, alkyl, alkoxy, cyano or hydroxyl; Ar$_1$ and Ar$_2$ are individually

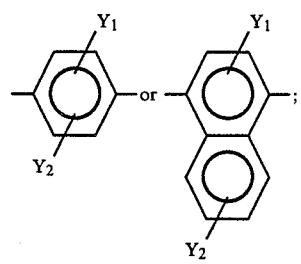

W$_1$ and W$_2$ are individually —N=N— or —N=CH—, but W$_1$ is —N=N— when W$_2$ is —N=CH—, m is 0 or 1, but m is 0 when W$_1$ is —N=CH—; and B is hydroxyl, alkoxy, alkoxyalkoxy, p-alkylbenzyloxy,

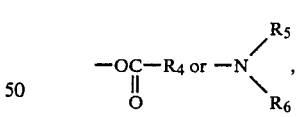

but B is hydrogen, halogen, cyano,

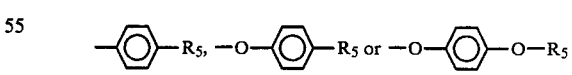

when W$_1$ or W$_2$ is —N=CN—, R$_4$ is alkyl, phenyl or cyclohexyl unsubstituted or substituted with alkyl or alkoxy at the p-position thereof, R$_5$ is hydrogen or alkyl, R$_6$ is alkyl or

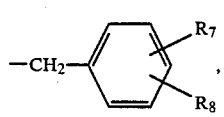

R7 and R8 are individually hydrogen, halogen, hydroxyl, cyano, alkyl, dialkylamino, alkoxy, alkoxyalkoxy,
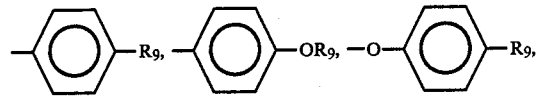
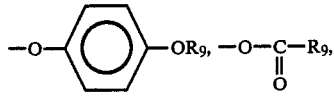
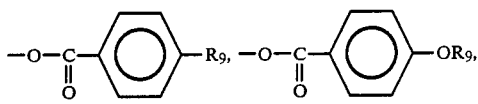
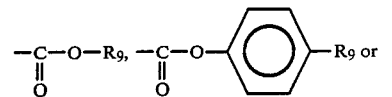
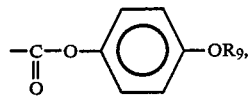
and R9 is hydrogen or alkyl.
17. The composition as claimed in claim 16, wherein the concentration of the dichroic azo dyestuff in the liquid crystal composition is a concentration of 0.01–10 wt.%.